United States Patent [19]

Angell et al.

[11] Patent Number: 4,716,561
[45] Date of Patent: Dec. 29, 1987

[54] DIGITAL TRANSMISSION INCLUDING ADD/DROP MODULE

[75] Inventors: Eric H. Angell, North Andover; Thomas J. Aprille, Andover; Juan O. Azaret; Rong-Chin Fang, both of North Andover; Byeong G. Lee, Methuen, all of Mass.; Brian C. Longwell, Kingston, N.H.; Craig A. Sharper, Bradford, Mass.; Jan-Dieter Spalink, Woodbridge, Va.

[73] Assignee: American Telephone and Telegraph Company, AT&T Bell Laboratories, Murray Hill, N.J.

[21] Appl. No.: 769,509

[22] Filed: Aug. 26, 1985

[51] Int. Cl.[4] .......................... H04J 1/10; H04J 3/08
[52] U.S. Cl. ........................................ 370/55; 370/84
[58] Field of Search ...................... 370/55, 84, 85, 88, 370/86, 68

[56] References Cited

U.S. PATENT DOCUMENTS

| | | | |
|---|---|---|---|
| 3,665,405 | 5/1972 | Sanders et al. | 370/55 |
| 3,982,077 | 9/1976 | Clark et al. | 370/84 |
| 4,432,087 | 2/1984 | Hubbard | 370/55 |
| 4,434,485 | 2/1984 | Huffman et al. | 370/55 |
| 4,520,479 | 5/1985 | Grima et al. | 370/84 |

OTHER PUBLICATIONS

R. J. Boehm and Yau C. Ching, SONET (Synchronous Optical Network), Bell Communications Research.

DDM-1000 Dual DS3 Multiplexer for Both Loop and Trunk, Marketing Communications, Mar. 1985.

Primary Examiner—Michael A. Masinick
Assistant Examiner—Wellington Chin
Attorney, Agent, or Firm—Thomas Stafford

[57] ABSTRACT

In a transmission system, adding and/or dropping any one or more of a plurality of digital signals of one or more digital transmission bit rates is facilitated by employing a unique transmission signal in which data words associated with individual digital signals are arranged in prescribed groups. The transmission signal data word groups are obtained by formatting the individual digital signals to be combined into a unique channel frame format common to all of the digital signals and by employing a unique one-step multiplexing process to insert digital words from the channel frames into the group of data word positions in the transmission signal associated with the particular signal being combined. Consequently, digital signals may be added to the transmission signal by formatting them into the common channel frame format and, then, inserting the digital words therefrom in the one-step multiplexing process into an associated group of data words positions in the transmission signal. Digital signals are dropped from the transmission signal by extracting associated groups of data words from the transmission signal, identifying the corresponding channel frames and deformatting the data bits from channel frames of corresponding digital signals being reconstructed.

64 Claims, 23 Drawing Figures

COMMON CHANNEL FRAME

CHANNEL FRAME
FOR DLU-1

CHANNEL FRAME
FOR DLU-1C

CHANNEL FRAME
FOR DLU-3

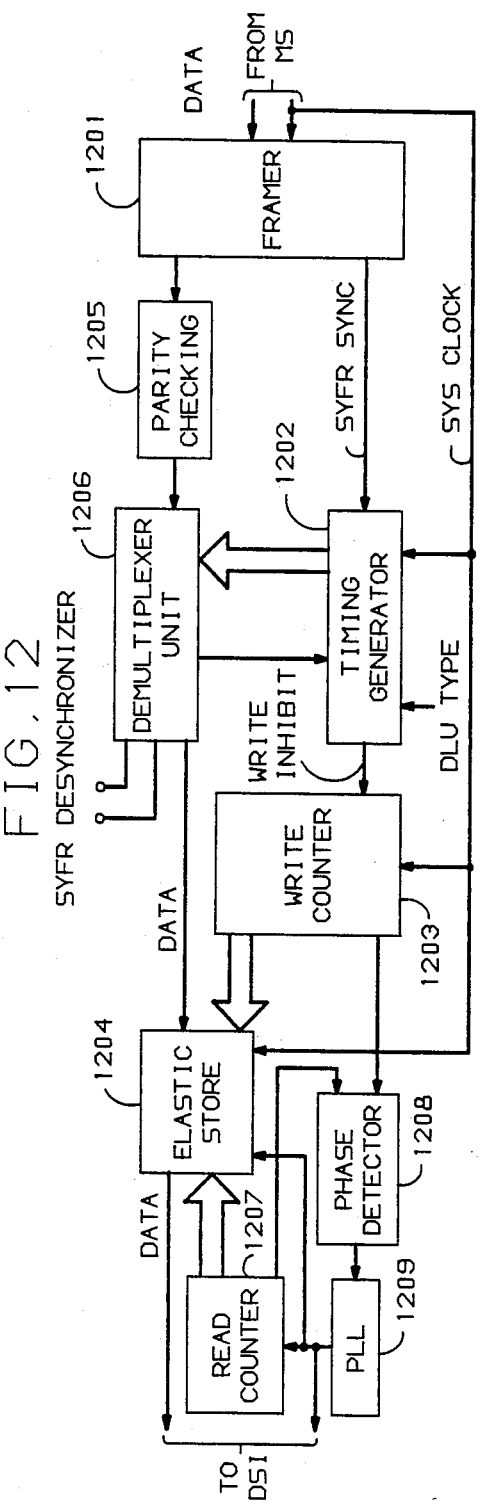
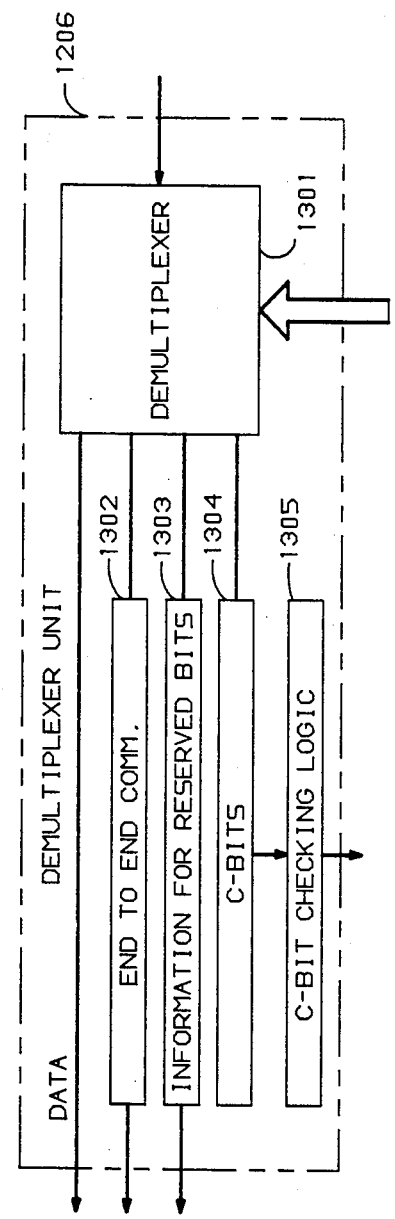
FIG. 12
SYFR DESYNCHRONIZER
FIG. 13

DIGITAL TRANSMISSION INCLUDING ADD/DROP MODULE

CROSS-REFERENCE TO RELATED APPLICATION

U.S. patent applications Ser. Nos. 769,427, and 769,508 were filed concurrently herewith.

TECHNICAL FIELD

This invention relates to digital transmission systems and, more particularly, to the adding and/or dropping of one or more digital signals to and/or from a transmission signal including a plurality of digital signals of one or more transmission bit rates.

BACKGROUND OF THE INVENTION

Digital transmission of signals has become widespread. To this end, a variety of digital transmission media are available which have different transmission characteristics and different information capacity. In order to make efficient use of the various transmission media, a hierarchy of transmission systems has been developed which operates at different transmission bit rates. In North America, the hierarchy includes the DS1 signal transmitted at 1.544 Mb/sec, the DS1C signal transmitted at 3.152 Mb/sec, the DS2 signal transmitted at 6.312 Mb/sec and the DS3 signal transmitted at 44.736 Mb/sec. A similar but different hierarchy is used in Europe.

All of the digital signals to be transmitted enter and leave the digital hierarchy by means of some sort of signal conversion terminal. Additionally, in order to go from one display transmission rate to some other digital transmission rate, one or more multiplexing steps are required. For example, the DS1C transmission signal is obtained by multiplexing two DS1 signals in a M1C multiplexer; the DS2 transmission signal is obtained by multiplexing four DS1 signals in a M12 multiplexer; and the DS3 transmission signal is obtained by multiplexing 28 DS1 signals in a two-step operation of first multiplexing the 7 DS2 signals into the DS3 signal via a M13 multiplexer.

In a so-called MX3 multiplexer, a mix of the DS1, DS1C and DS2 signals are multiplexed into the DS3 format. To this end, four DS1 signals are first multiplexed in a DS1 to DS2 multiplexer to obtain a 6.312 Mb/sec DS2 signal. Similarly, two DS1C signals are each first demultiplexed into two 1.544 Mb/sec signals. Then, the four resulting 1.544 Mb/sec signals are multiplexed in a DS1 to DS2 multiplexer to obtain a 6.312 Mb/sec DS2 signal. The DS2 signal is merely adjusted for system timing purposes to have the MX3 system 6.312 Mb/sec timing. The 6.312 Mb/sec signals are then appropriately multiplexed to obtain the 44.736 Mb/sec DS3 level signal. Thus, multiple multiplexing steps are required and, for the DS1C, the demultiplexing and, then, multiplexing steps are needed. Recovery of the signals from the DS3 format requires similar demultiplexing steps. Such multiple multiplexing and multiple demultiplexing requires additional equipment and, therefore, makes dropping and adding signals at intermediate locations expensive.

For high capacity transmission, it is desirable to be able to easily combine a plurality of one or more of the digital signals in the hierarchy without the need for intermediate multiplexer (demultiplexer) stages or a number of different multiplexing (demultiplexing) schemes. Additionally, it is equally desirable to be able to easily add and/or drop one or more digital signals of one or more digital transmission bit rates without the need of multiple multiplexing and/or demultiplexing processes.

SUMMARY OF THE INVENTION

In a transmission system, adding and/or dropping any one or more of a plurality of digital signals of one or more different digital transmission bit rates is facilitated by employing a unique transmission signal format that is obtained by converting digital signals into a unique common frame format and by using a unique onestep multiplexing process for inserting the digital words from the common frame into the transmission signal format in a predetermined manner. The transmission signal format includes a repetitive frame having a predetermined number of data words and a predetermined number of overhead words interleaved in a prescribed pattern. The transmission signal format is arranged so that digital words from the common frames formed from each digital signal to be transmitted are "grouped" or arranged in one or more of the data words of the pattern of the transmission signal format in a predetermined manner. The number of data words in a "group", i.e., one or more data words, for a particular signal is determined by the number of quivalent lowest transmission bit rate signals included in the particular signal.

Consequently, digital signals are readily added to the transmission signal by framing into the unique common frame format and by directly inserting digital words from the common frames via the unique one-step multiplexing process into an appropriate "group" of the data words in the transmission signal format. Digital signals are dropped from the transmission signal by a one-step demultiplexing process of selecting an appropriate "group(s)" of the data words and then deformatting the "group(s)" to reconstruct the particular digital signal(s).

BRIEF DESCRIPTION OF THE DRAWING

The invention will be more fully appreciated from the following detailed description when the same is considered in connection with the accompanying figures in which:

FIG. 12 depicts in simplified block diagram form details of the SYFR desynchronizer used in the SYFR synchronizer-desynchronizer of FIG. 9;

FIG. 13 shows in simplified block diagram form details of the demultiplexer used in the SYFR desynchronizer of FIG. 12;

DETAILED DESCRIPTION

Figure 1:
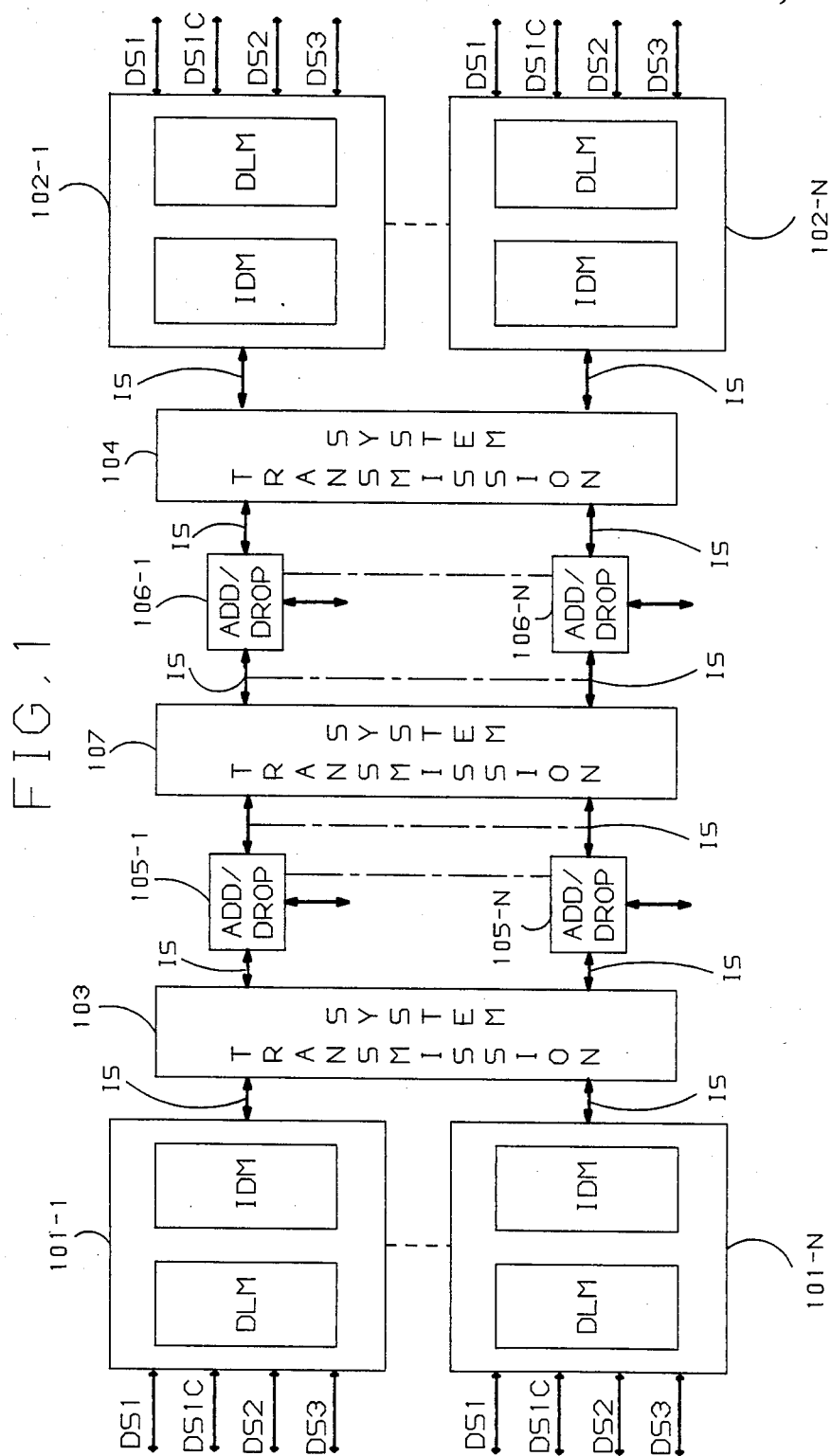
FIG. 1 shows a simplified block diagram form of transmission system arrangement incorporating an embodiment of the invention.

The invention is intended for use in combining a plurality of one or more digital signals, for example, DS1, DS1C, DS2 or DS3, or combinations thereof, to facilitate high capacity transmissions. Accordingly, shown in FIG. 1 is an example of a transmission arrangement in which an embodiment of the invention may be advantageously employed. To this end, shown are so-called near-end bank terminals 101-1 through 101-N and far-end bank terminals 102-1 through 102-N. Each of bank terminals 101 and 102 includes a digital line module (DLM) and an interleaver and disinterleaver module (IDM) and is capable of combining a plurality of one or more digital signals of one or more digital transmission bit rates, for example, DS1, DS1C, DS2 or DS3, or a combination thereof, to form an interconnect signal (IS). The IS transmission signal is supplied from terminals 101 to transmission system 103 and from terminals 102 to transmission system 104. Conversely, an IS transmission signal is supplied from transmission systems 103 and 104 to bank terminasl 101 and 102, respectively. Bank terminals 101 and 102 convert the incoming IS signal into appropriate ones of the digital signals, as will be explained hereinafter. IS signal outputs from transmission system 103 are supplied to add/drop terminals 105-1 through 105-N. IS outputs from add/drop terminals 105 are supplied via transmission system 107 to appropriate ones of add/drop terminals 106-1 through 106-N. Similarly, IS outputs from add/drop terminals 106 are also supplied via transmission system 107 to corresponding ones of add/drop terminals 105.

Although N add/drop terminals are shown, it should be understood that some transmission paths may not include intermediate add/drop terminals and other paths may include several add/drop terminals. That is to say, that some bank terminals may be connected directly through a transmission system to other bank terminals while others may be connected via a transmission path including one or more intermediate add/drop terminals. At each of the add/drop terminals, one or more of the digital signals in a predetermined set, i.e., DS1, DS1C, DS2 or DS3, or any combination thereof, may be advantageously added and/or dropped in a unique one-step multiplexing scheme as desired, as will be explained hereinafter.

The transmission systems interconnecting the bank terminals and/or add/drop terminals may be any known arrangements capable of multiplexing, if desired, several IS signals for higher capacity transmission. Preferably, a lightwave system is advantageously employed to transmit a plurality of combined IS signals.

Figure 2:
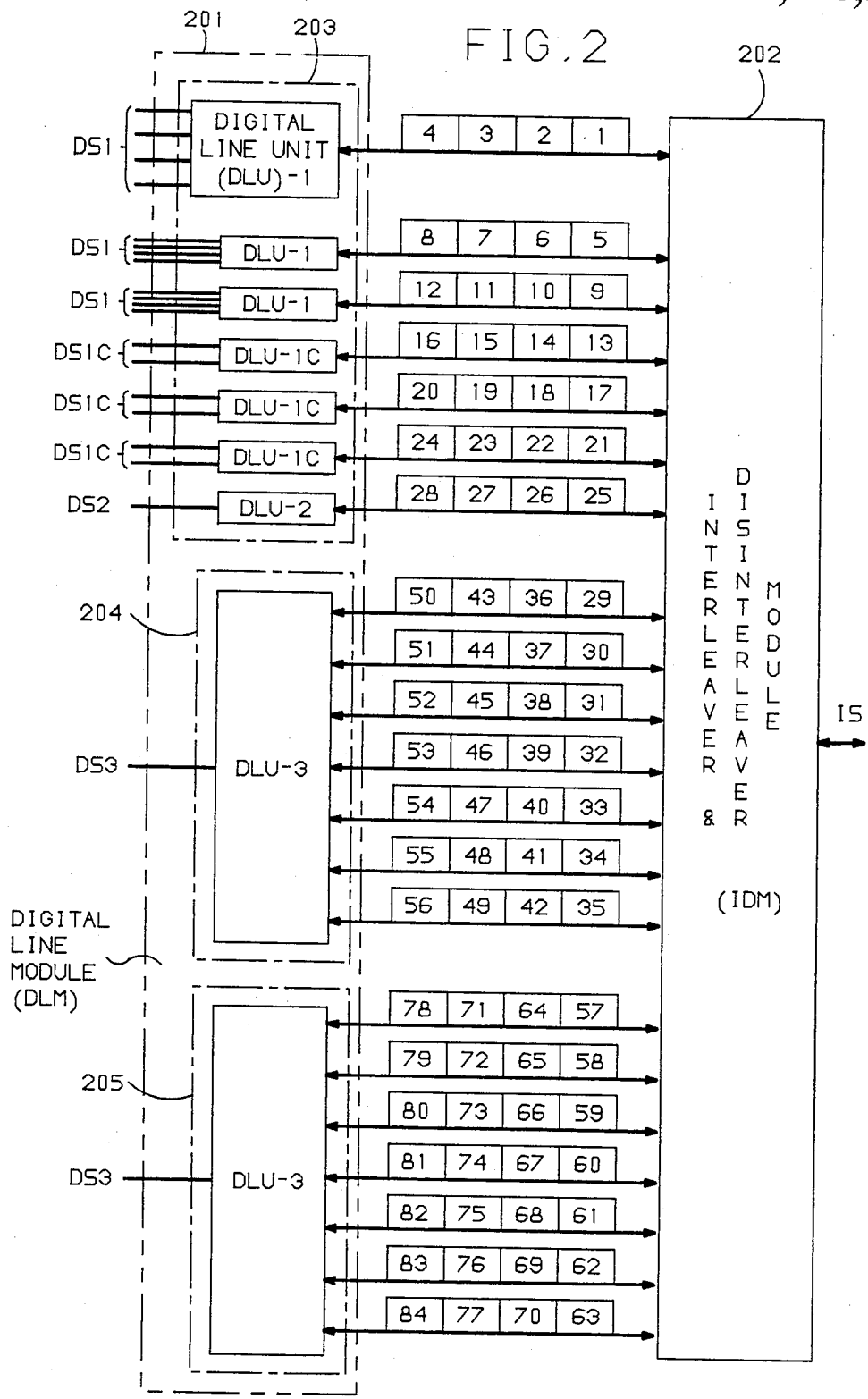
FIG. 2 depicts in simplified block diagram form the digital line module (DLM), and interleaver and disinterleaver module (IDM) shown in FIG. 1.

FIG. 2 shows in simplified block diagram form an example of a digital line module (DLM), namely, DLM 201, and its relationship to an interleaver and disinterleaver module, namely, IDM 202. As indicated above, the DLM is employed to arrange a plurality of one or more digital signals having one or more digital transmission bit rates, in accordance with an aspect of the invention, into a common frame format to facilitate combining the signals into a so-called IS signal for transmission.

Figure 8:
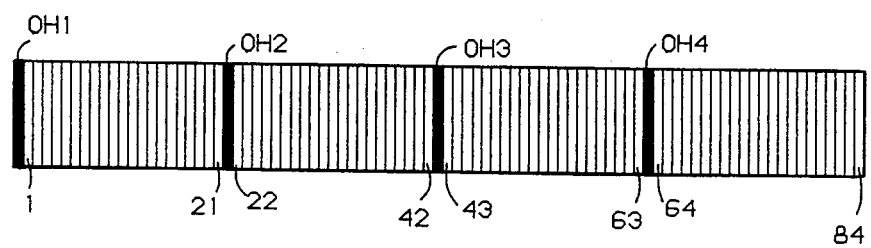
FIG. 8 illustrates the interconnect signal (IS) format of the invention generated by IDM of FIG. 2.

One example of an IS signal frame format is shwon in FIG. 8. The IS signal frame format includes a plurality of data words, in this example 84, and a plurality of other words, in this example four so-called overhead words, interleaved in a prescribed pattern. Each of the words includes a predetermined number of bits, in this example 16, and is in a prescribed form, in this example parallel word form. However, it should be understood that a different number of bits may be used and/or that serial word form may be also used. Each of the data words in the IS format is in predetermined relationship to the lowest transmission bit rate signal intended to be combined, in this example the DS1 signal. That is to say, one data word includes data for one equivalent DS1 signal. Thus, the IS signal format in this example is intended to include up to 84 equivalent DS1 signals. Therefore, any combination of digital signals to be combined that equals 84 equivalent DS1 signals can be advantageously accommodated by a DLM. The signals to be combined may be all DS1 signals, all DS1C, all DS2 or all DS3 or any combination thereof that equals the 84 equivalent DS1 signals. As is known, the DS1C includes two DS1 signals, DS2 includes four DS1 signals and DS3 includes 28 DS1 signals. The reason for indicating equivalent DS1 signals is because the DS1C, DS2 and DS3 signals also include additional bits other than data, commonly referred to as overhead bits.

Returning to FIG. 2, DLM 201 includes, in this example, units 203, 204 and 205, each of which can accommodate 28 equivalent DS1 signals. Thus, in this example, unit 203 includes so-called digital line units (DLU) to accommodate DS1 signals, namely DLU-1, DS1C signals, namely DLU-1C, and DS2 signals, namely DLU-2. Each DLU-1 unit accommodated four DS1 signals, each DLU-1C accommodates two DS1C signals and each DLU-2 accommodates one DS2 signal. Thus, in this example, unit 203 includes three DLU-1 units for interfacing 12 DS1 signals, three DLU-1C units for interfacing six DS1C signals which is the equivalent of 12 DS1 signals and 1 DLU-2 unit for interfacing one DS2 signal which is the equivalent of four DS1 signals. Units 204 and 205 each includes a DLU-3 unit which accommodates a single DS2 signal. The DS3 signal is the equivalent of 28 DS1 signals. Consequently, DLM 201 interfaces, in this example, the equivalent of the 84 DS1 signals to IDM 202.

Figure 3:
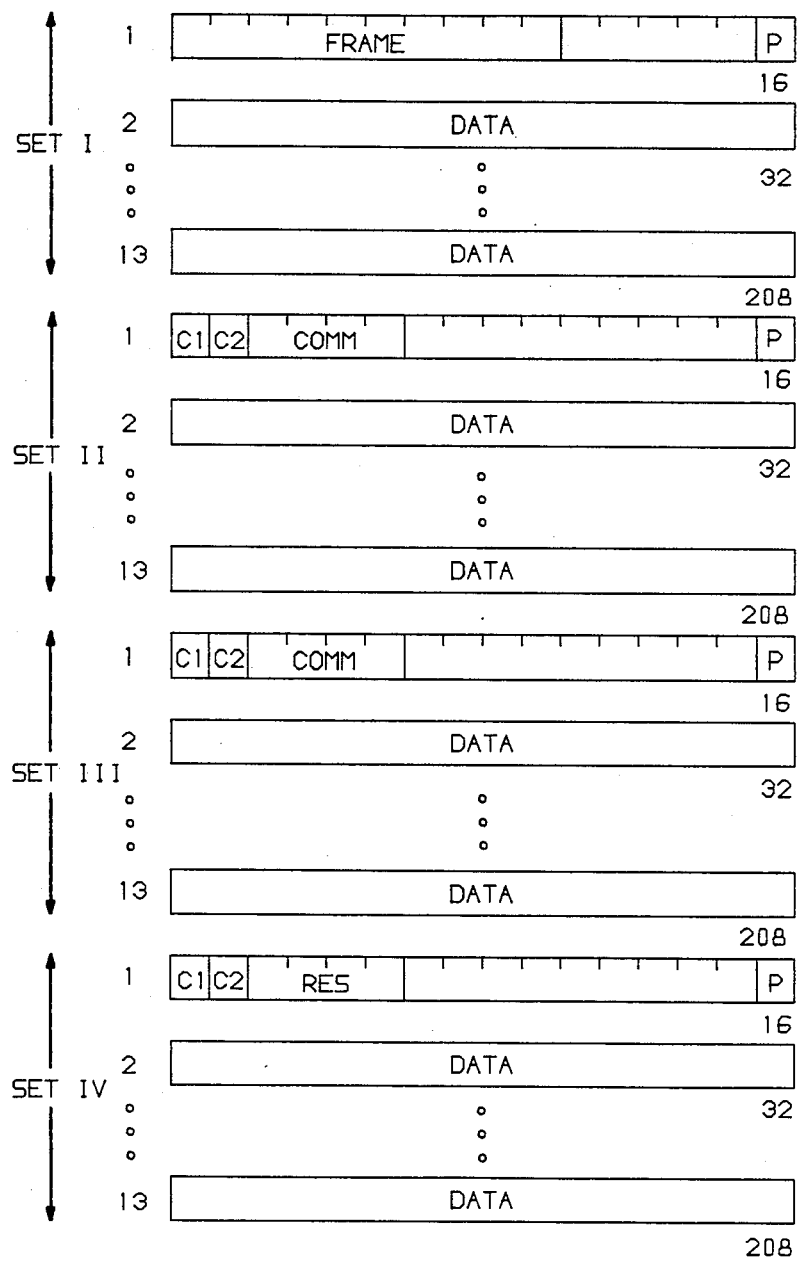
FIG. 3 illustrates the general channel frame format of the invention used in the DLM of FIG. 2.

Each of the DLUs arranges the corresponding digital signal, in accordance with an aspect of the invention, into a unique single common frame format. The basic frame format is designated the channel frame and is broadly shown in FIG. 3. As shown, in this example and not to be construed as limiting the scope of the invention, the channel frame includes a plurality of sets of bits, namely, sets I, II, III and IV, each having 208 bits. Each of sets I, II, III and IV includes a predetermined number of data bit positions and a predetermined number of other bit positions, commonly referred to as overhead bits. Thus, in set I there are 197 data bit positions, ten framing bit positions and one parity bit position; in sets II and III there are 201 data bit positions, two stuffing check bit positions (C1 and C2), four communication bit positions and one partity bit position; and, finally, in set IV there are also 201 possible data bit positions, two stuffing check bit positions (C1 and C2), four reserve bit positions and one parity bit position. The stuffing check bit C2 is not usef for DS3 signals. Two of the possible data bit positions in set IV are employed as stuff bit positions which can be data or stuff bits for DS1, DS1C and DS2 signals. For DS3 signals, only one stuff bit position is used. Thus, in this example, the common channel frame includes 832 bit positions and has enough data bit positions to accommodate the digital signal having the highest transmission bit rate, i.e., the DS3 signal. It should be noted that the overhead bits are distributed among the sets in the channel frame format and are in the first word of each set. This facilitates easy recovery of both the overhead bits and the data bits. However, it will be apparent to those skilled in the art that other overhead bit distributions may be equally employed. The number of data bit positions used in a channel frame is dependent on the particular signal being formatted. In this example, the DS1 signal uses 773 data bit positions, and DS1C signal uses 789 data bit positions, the DS2 signal uses 790 data bit positions and the DS3 signal uses 799 data bit positions. The unused bit positions may be utilized for other purposes as desired, for example, they may be employed to provide a data channel or an additional end-to-end communications channel.

The number of channel frames used during a socalled common channel frame interval is determined in accordance with a predetermined relationship based on the number of equivalent DS1 signals that are in the particular signal. In this example, the DS1 signal uses one common channel frame per common channel frame interval. The common channel frame interval in this example is 0.5 milliseconds (the reciprocal of the channel frame repetition rate for DS1 signals which is a submultiple of the DS1 normal frame repetition rate of 8 kHz or 2 kHz). It should be noted that other channel frame repetition rates for DS1 signals may be equally employed, some examples being 4 kHz and 8 kHz. Indeed, the channel frame repetition rate may be selected to be a non-integer value if desired or convenient. If a repetition rate other than 2 kHz is used, the channel frame repetition rates for DS1C, DS2 and DS3 signals must be adjusted accordingly. The DS1C signal uses two channel frames per common channel frame interval. The DS2 signal uses four channel frames per common channel frame interval. Finally, the DS3 signal uses 28 channel frames per common channel frame interval. In this embodiment, as will be explained hereinafter, the number of channel frames per common channel frame interval is obtained by using a different but related frame repetition rate for each of the signals. The repetition rate for the particular signal is determined by the number of equivalent DS1 signals in the particular signal and the channel frame repetition rate for the DS1 signal. Thus, in this example the channel frame repetition rate for DS1 is 2 kHz (2 kHz$\times$1 DS1 Eq), for DS1C is 4 kHz (2 kHz$\times$2 DS1 Eq), for DS2 is 8 kHz (2 kHz$\times$4 DS1 Eq), and for DS3 is 56 kHz (2 kHz$\times$28 DS1 Eq). Each of the channel frames can be thought of as including a plurality of digital words having a predetermined number of bits, in this example each word has 16 bits. Thus, each set has 13 words, and each frame has 52 words and a total of 832 bits. Although in this example the channel frame includes 832 bit positions, it will be apparent that other arrangements having a different number of bits may be used if desired. It should be noted, however, that the number of bits in the channel frame is related to the channel frame repetition rate. For example, if the number of bits in the channel frame is halved, then the channel frame repetition rate would be doubled.

Returning to FIG. 2, the information from the channel frames formed from the digital signals to be combined is supplied to IDM 202 in a prescribed sequence to be interleaved into the IS frame format of FIG. 8. In this embodiment, 16-bit digital words are serially supplied over a plurality of circuit paths at a predetermined bit rate of 6.656 Mb/sec. Each of units 203, 204 and 205 supplies seven circuit paths for a total of 21 and each circuit path supplies four 16-bit words per IS frame. For a DLU-1 which interfaces four DS1 lines, the sequence is to supply a 16-bit word from each of the four DS1 frames in sequence as shown. Thus, digital words from the channel frames corresponding to DS1(1), DS1(2), DS1(3) and DS1(4) are serially supplied at 6.656 Mb/sec to IDM 202. For a DLU-1C, 16-bit digital words are supplied from the frames corresponding to the two interfaced DS1C signals, in this example, in a sequence wherein a word is taken from DS1C(1), then DS1C(2), then DS1C(1), then DS1C(2), until all words from the corresponding channel frames are transferred to IDM 202. An alternative would be to take two words from DS1C(1) and, then, two words from DS1C(2). For a DLU-2, the 16-bit words are supplied from the corresponding channel frame at the 6.656 Mb/sec rate as shown. Similarly, for a DLU-3, the 16-bit words are supplied from the corresponding channel frames over seven circuit paths in the sequence from circuit path to circuit path as shown in FIG. 2. That is to say, one word is supplied to each of the seven circuit paths in sequence, namely, 29–35 (FIG. 2), then another word is supplied to each of the seven circuit paths in sequence, namely, 36–42, etc., until the 28 words are supplied to IDM 202 during the interconnect signal frame interval. An alternative for DS3 would be to supply four words to each circuit in sequence, i.e., words 29–32 of the first circuit path, words 33–36 to the second circuit path, words 37–40 to the third circuit path, etc.

In this example, IDM 202 converts the serial data words from DLM 201 to parallel word form and inserts them in the data word positions in the IS frame format of FIG. 8, as will be explained further below in relationship to FIG. 21.

The data words are inserted in the IS frame format so that data words from channel frames of a particular incoming signal are "grouped" in a prescribed pattern. In this example, the IS frame format includes data words 1–12, each of which corresponds to a separate DS1 signal; data words 13 and 15 correspond to a particular DS1C signal, as do data words 14 and 16, 17 and 19, 18 and 20, 21 and 23, and 22 and 24; data words 25–28 correspond to a particular DS2 signal; data words 29–56 correspond to a particular DS3 signal; and data words 57–84 correspond to another particular DS3 signal. Thus, data word 1 in the IS frame format is a "group" corresponding to a particular DS1 signal, as are the individual data words 2–12. Similarly, data words 13 and 15 are a "group" corresponding to a particular DS1C signal, as are data words 14 and 16, 17 and 19, 18 and 20, 21 and 23, and 22 and 24. Data words 25–28 are a group corresponding to the DS2 signal. Data words 29–56 are a group corresponding to a particular DS3 signal. Finally, data words 57–84 are a group corresponding to another particular DS3 signal. In this example, the IS frame repetition rate is 104 kHz and the IS signal output from IDM 202 is supplied at a 146.432 Mb/sec rate to a transmission system for transmission as desired. Thus, the IS signal repetitive frame interval is approximately 9.615 microseconds.

In the receive direction, IDM 202 receives an IS signal, for example, similar to that described above for the transmission direction. The data words of the received IS signal are disinterleaved, i.e., extracted from the IS signal data word positions, and supplied to the corresponding DLUs in DLM 201 in the sequences as shown in FIG. 2 at the 6.656 Mb/sec rate. The individual DLUs desynchronize (deformat) the 6.656 Mb/sec rate signals and supply the corresponding DS1, DS1C, DS2 and DS3 signals to the transmission hierarchy as described below.

Figure 9:
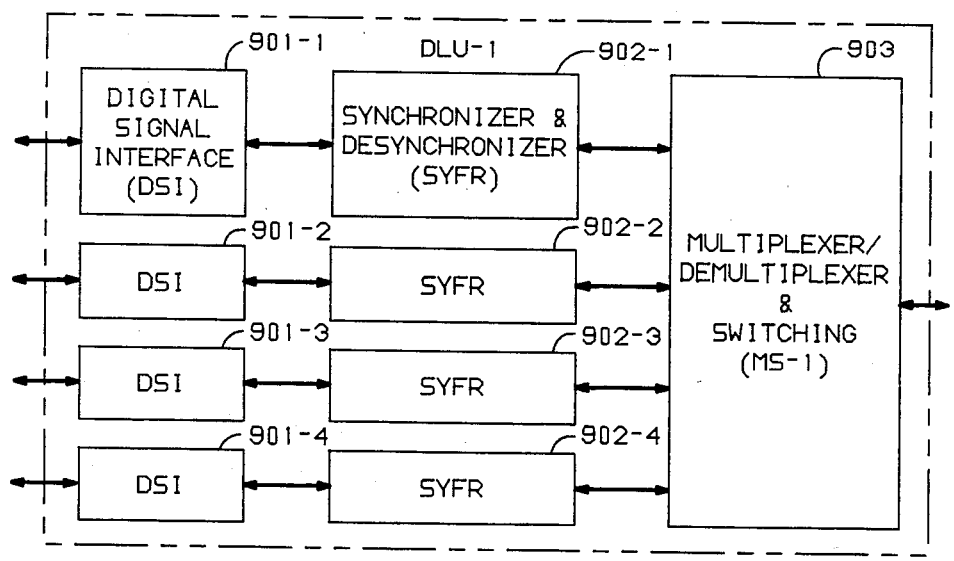
FIG. 9 shows in simplified block diagram form details of DLU-1 used in the DLM of FIG. 2.

FIG. 9 shows in simplified block diagram form details of DLU-1 of FIG. 2. Although the circuit paths are shown as bidirectional for simplicity and clarity of description, it should be understood that separate circuit paths may be employed for each direction of transmission and that appropriate connections are made to facilitate both directions of transmission as will be apparent to those skilled in the art. DLU-1, as shown in FIG. 9, is advantageously employed to interface up to four individual DS1 signals. Accordingly, shown are digital signal interface (DSI) units 901-1, 901-2, 901-3 and 901-4 for interfacing incoming and outgoing DS1 digital signals. DSIs 901 each include a phase-locked loop for recovering the DS1 clock signal of 1.544 Mb/sec, a bipolar-to-unipolar converter and vice versa, an equalizer for the equalization of gain and/or delay distortion, performance monitoring apparatus, provision for DS1 loopback maintenance, etc. Such DSI units for interfacing incoming and outgoing DS1 digital signals are well known in the art. DSI 901-1 through DSI 901-4 each provide a DS1 unipolar signal and a recovered 1.544 Mb/sec clock signal to a corresponding one of synchronizer and desynchronizer (SYFR) units 902-1 through 902-4. Similarly, reconstructed unipolar DS1 signals from SYFR 902-1 through SYFR 902-4 are supplied to corresponding ones of DSI 901-1 through DSI 901-4 to be converted to bipolar PCM and applied to an outgoing DS1 transmission line.

As will be explained below, each of SYFRs 902 includes a synchronizer for formatting, in accordance with an aspect of the invention, the DS1 signal into the unique DLU-1 channel frame format shown in FIG. 4 and a desynchronizer for deformatting data words from the IS frame format corresponding to a DS1 signal in the unique DLU-1 channel frame format of FIG. 4.

Multiplexer/demultiplexer and switch (MS-1) unit 903 supplies digital words from SYFRs 902-1 through 902-4 in a prescribed sequence to IDM 202 (FIG. 2). In this example, one 16-bit digital word is taken from each of SYFRs 902 in sequence and supplied in serial form at 6.656 Mb/sec to IDM 202. Similarly, MS-1 903 supplies 16-bit digital words received from IDM 202 to appropriate ones of SYFR 902-1 through SYFR 902-4 for deformatting from the channel frame format.

Figure 10:
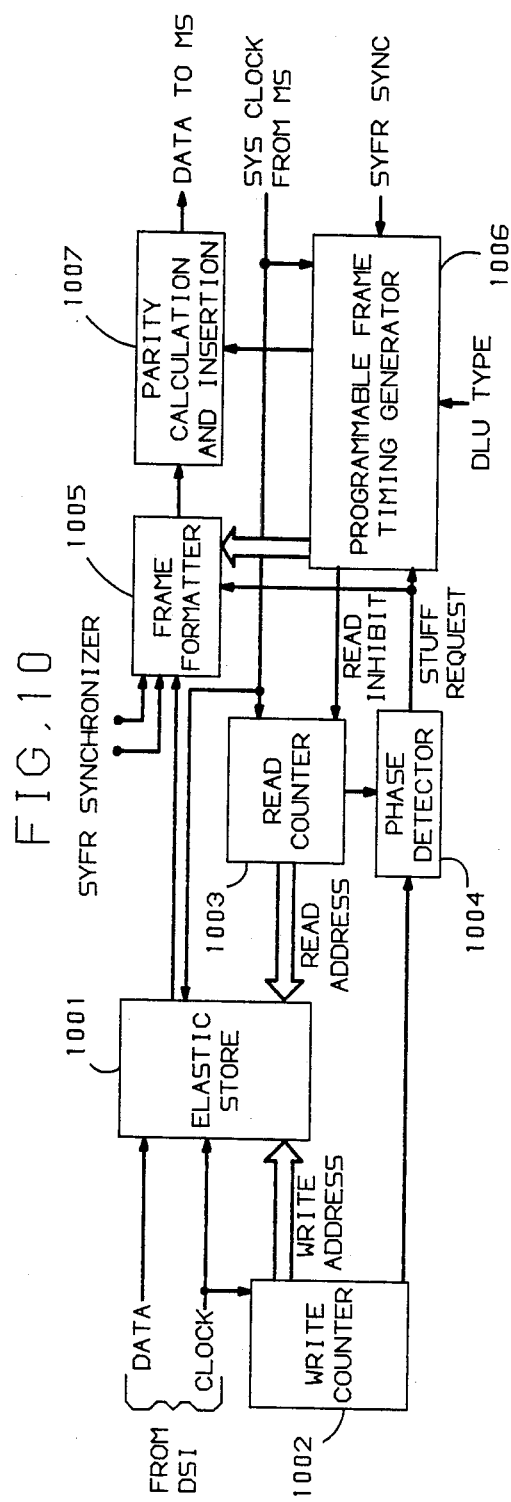
FIG. 10 depicts in simplified block diagram form details of the SYFR synchronizer used in the SYFR synchronizer-desynchronizer of FIG. 9.

FIG. 10 shows in simplified block diagram form details of the SYFR synchronizer employed in SYFRs 902 of FIG. 9. It is noted that the SYFR synchronizer is essentially identical in each of the DLU units, namely DLU-1, DLU-1C, DLU-2 and DLU-3, except for clock rates, the number of data bits used in the channel frame format and the position of stuff bits S1 and S2 in the format.

Accordingly, shown in FIG. 10 is elastic store 1001 to which an incoming unipolar digital signal and associated clock signal are supplied from a corresponding DSI. The incoming clock signal is also supplied to write counter 1002. Write counter 1002 supplies write addresses to elastic store 1002 for writing the incoming digital signal into memory at the incoming line rate, for DS1 in a DLU-1 at 1.544 Mb/sec. Also supplied to elastic store 1001 is SYS CLOCK which is obtained from a corresponding MS unit. Read counter 1003 supplies read addresses to elastic store 1001 for reading the stored information at the SYS CLOCK rate, for DS1 in a DLU-1 at 1.664 Mb/sec. The higher SYS CLOCK rate allows for insertion of overhead bits and for bit stuffing. Bit stuffing is employed to avoid so-called spilling of elastic store 1001. To this end, phase detector 1004 is responsive to phase outputs from write counter 1002 and read counter 1003 for generating a so-called stuff request dependent on the relationship of the write and read addresses to a predetermined threshold in well-known fashion. The stuff request signal is supplied to frame formatter 1005 and programmable frame timing generator 1006.

Figure 4:
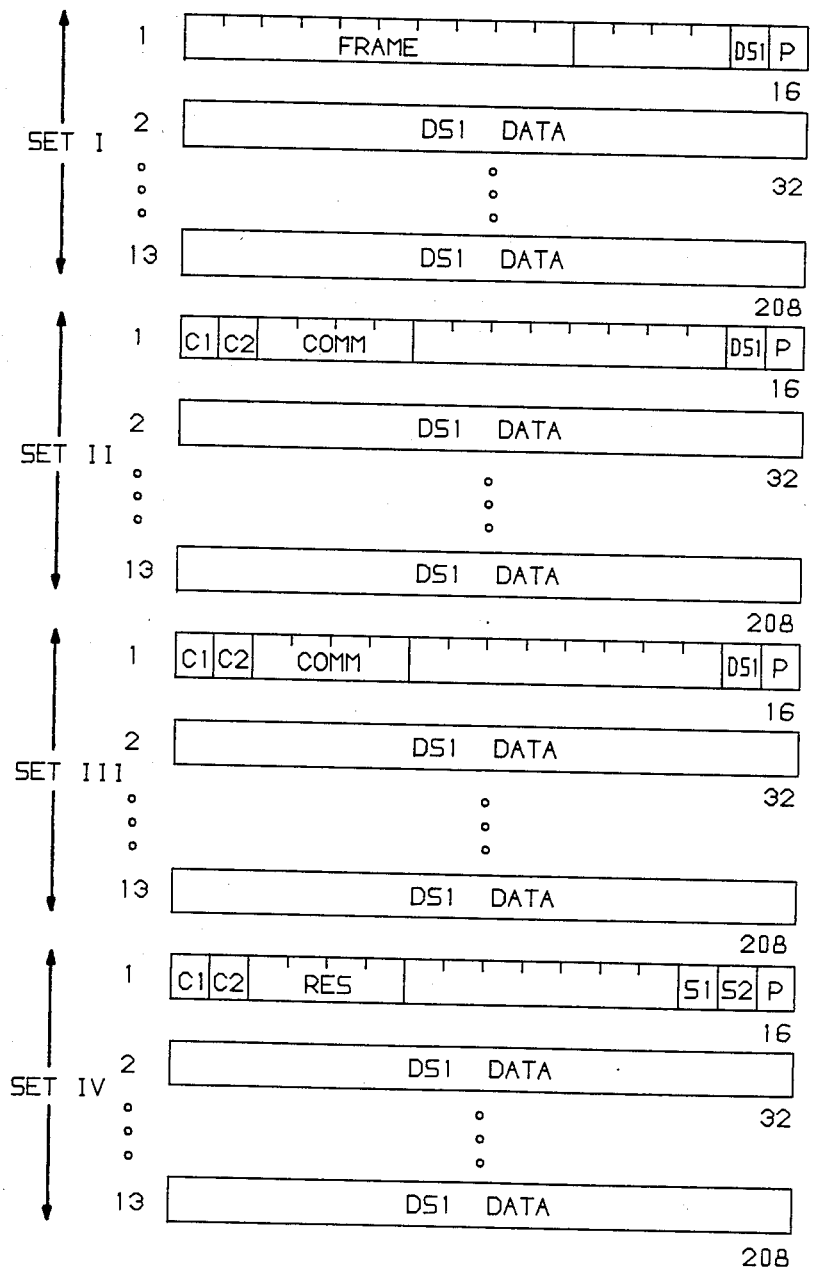
FIG. 4 illustrates the channel frame format of the invention used in the digital line unit for DS1 signals, namely, DLU-1 of FIG. 2.

Referring briefly to FIG. 4, the stuff bits are bits S1 and S2 and the indication as to whether they are data or stuff bits is contained in bits C1 and C2, respectively. In this example, a majority decision is made as to whether the bit is a stuff bit or a data bit. Thus, a stuff bit is indicated by two or all logical 1's in the corresponding C-bit (C1 or C2) positions in sets II, III and IV of FIG. 4 and a data bit is indicated by two or all logical 0's. For normal operation, S1 is a stuff bit, as indicated by two or all of the C1 bits in sets II, III and IV being logical 1, and S2 is a data bit, as indicated by two or all of the C2 bits in sets II, III and IV being logical 0. When more data is being written into elastic store 1001 than some predetermined threshold between the write and read phases, both S1 and S2 are data bits (both C1 and C2 being two or all logical 0). When less data is being written in than the predetermined threshold, both S1 and S2 are stuff bits (both C1 and C2 being two or all logical 1).

Programmable frame timing generator 1006 is responsive to SYS CLOCK and SYFR SYNC signals from a corresponding MS unit and to a preset DLU type signal for generating timing signals to obtain the desired channel frame format. To this end, a read inhibit signal is supplied to read counter 1003 for inhibiting reading data from elastic store 1001 when other than data is to be read to frame formatter 1005. Frame formatter 1005 is supplied with data from elastic store 1001, end-to-end communication bits via circuit path 1008 and information for reserved bits via circuit path 1009. Frame formatter 1005 generates the unique common channel frame format in response to timing signals from programmable frame timing generator 1006 and the stuff request signal from phase detector 1004.

Figure 11:
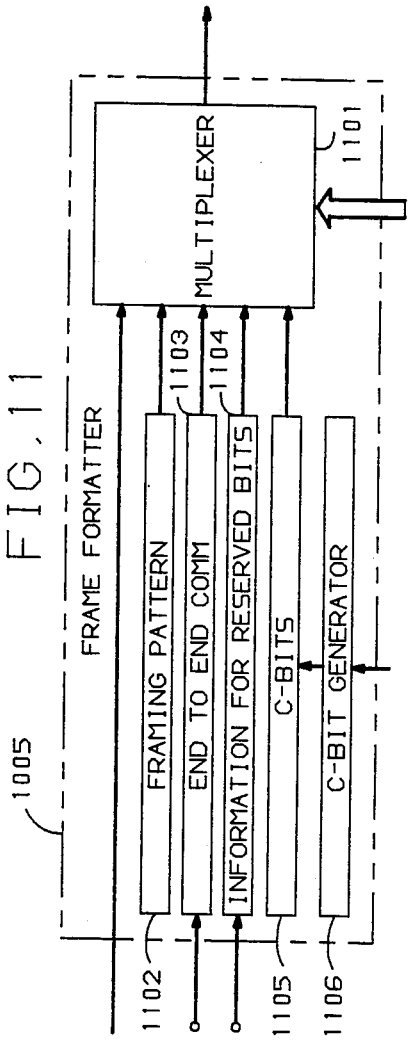
FIG. 11 shows in simplified block diagram for details of the frame formatter used in the SYFR synchronizer of FIG. 10.

Details of frame formatter 1005 are shown in simplified block diagram form in FIG. 11. Shown are multiplexer 1101, framing pattern register 1102, end-to-end communications register 1103, information for reserved bits register 1104, C-bits register 1105 and C-bit generator 1106. C-bit generator 1106 is responsive to the stuff request signal to generate an appropriate C-bit pattern dependent on whether the corresponding stuff bit, i.e., S1 or S2, is a stuff bit or a data bit. Multiplexer 1101, in response to timing signals from timing generator 1006 (FIG. 10), multiplexes, i.e., inserts, the framing pattern bits and C-bits with the data as shown in FIG. 4.

Returning to FIG. 10, unit 1007 performs a parity calculation and inserts the parity bit under control of programmable frame timing generator 1006 as shown in FIG. 4. In this example, parity is calculated from bit 17 of a previous set of bits to bit 15 of a subsequent set of bits in the channel frame format. The data as assembled in the unique common channel frame format is supplied to a corresponding MS.

For DS1 signals, the channel frame format is shown in FIG. 4 and is obtained under control of frame timing generator 1006. To this end, read counter 1003 is inhibited for bits 1–14 and 16 in set I during which the framing pattern is inserted from register 1102 (FIG. 11) into bits 1–10. Any desired framing pattern may be employed. In this example, the pattern is 1111010000. Bit positions 11–14 are not used. A DS1 data bit is inserted in bit 15 and a parity bit is inserted in bit 16. Bits 17–208 of set I are DS1 data. In sets II and III, counter 1003 is also inhibited from reading data during bits 1–14 and 16 during which the stuffing indicating bits C1 and C2 are inserted in bits 1 and 2, respectively, and end-to-end communications bits are inserted in bits 3–6. Bit positions 7–14 are not used. A parity bit is inserted in bit 16. Again, DS1 data is inserted in bit 15 and bits 17–208. In set IV, read counter 1003 is inhibited for at least bits 1–13 and inhibited for bits 14 and 15 depending on the stuff indication. If bits 14 and/or 15 are stuff bits, read counter 1003 is appropriately inhibited. The stuff indicating bits C1 and C2 are inserted into bits 1 and 2, respectively, information for reserved bits are inserted into bits 3–6. Bits 7 to 13 are not used. Again, bit 116 is a parity bit and bits 17–208 are DS1 data. Thus, if both of the stuff bits are included as data bits, the DS1 signal uses 773 of the available data bit positions in the channel frame.

In this example, the DLU-1 channel frame repetition rate is 2 kHz, which is the SYFR SYNC signal supplied to programmable frame timing generator 1006 from a corresponding MS.

FIG. 12 shows in simplified block diagram form details of the SYFR desynchronizer used in SYFRs 902 of FIG. 9. Accordingly, incoming data in the channel frame format is supplied from IDM 202 (FIG. 2) to MS-1 (FIG. 9) for DS1 signals and, in turn, to framer 1201. The SYS CLOCK is also supplied from MS-1 to framer 1201, timing generator 1202, write counter 1203 and elastic store 1204. In this example, SYS CLOCK is 1.664 Mb/sec for DS1 signals. Similarly, the SYFR SYNC signal, which is 2 kHz for DLU-1 applications, is also supplied from framer 1201 to timing generator 1202.

Framer 1201 frames in well-known fashion on the 10-bit framing pattern (1111010000, in this example) at the beginning of each channel frame (FIG. 4). Parity of the framed data is calculated and checked for errors in parity checking unit 1205. Again, parity is calculated from bit 17 of a previous set of bits to bit 15 of a subsequent set of bits in the channel frame format. If parity errors above a predetermined error threshold are detected, an out-of-parity condition is declared. If the occurrence of the out-of-parity state is more frequent than prescribed thresholds, an alarm is set and/or a protecton switch is initiated. The channel frame data is demultiplexed, i.e., extracted, in demultiplexer unit 1206 to obtain the DS1 signal, end-to-end communication bits, reserved bits and C-bits. Details of demultiplexer unit 1206 are shown in FIG. 13 and described below. A stuff indicator signal indicating whether the stuff bit positions, i.e., bits S1 and S2 (FIG. 4), include a data bit or a stuff bit is supplied from demultiplexer unit 1206 to timing generator 1202. Timing generator 1202 is responsive to SYFR SYNC and SYS CLOCK for generating signals for controlling demultiplexer unit 1206 and, additionally, to the stuff indicator signal for generating a write inhibit signal when the stuff bit positions include stuff bits. Timing generator 1202 also generates write inhibit signals during the other overhead bit positions, namely, framing, parity, end-to-end communications, C-bits and reserved bits (see FIG. 4). Write counter 1203, under control of SYS CLOCK, and timing generator 1202 generates addresses for writing the demultiplexing data into elastic store 1204 at the SYS CLOCK rate for DLU-1 of 1.664 Mb/sec. Similarly, read counter 1207, under control of the recovered line clock, generates addresses for reading the stored data out of elastic store 1204 at the line rate for DLU-1 of 1.544 Mb/sec. Phase outputs from write counter 1203 and read counter 1207 are supplied to phase detector 1208. Phase detector 1208 generates a signal representative of the phase difference between the read and write counter outputs. The phase difference signal is supplied to phase-locked loop (PLL) 1209 which generates the desired line clock of 1.544 Mb/sec in well-known fashion. The desynchronized data and line clock signal are supplied to an associated DSI unit for conversion to bipolar DS1 for transmission.

FIG. 13 shows in simplified block diagram form details of demultiplexer unit 1206. Accordingly, shown is demultiplexer 1301 which is supplied with the incoming signal in the channel frame format, in this example, for a DLU-1 as shown in FIG. 4. Also known are register 1302 for storing end-to-end communication bits, register 1303 for storing reserved bits, register 1304 for storing the C-bits and C-bit checking logic 1305. Demultiplexer 1301 is controlled by timing signals for timing generator 1202 to demultiplex the bits of the incoming channel frame. Thus, referring to FIG. 4 for the channel frame format for DS1 signals used in DLU-1, the end-to-end communication bits, namely bits 3–6 in sets II and III, are supplied to be stored in register 1302 for use as described. Similarly, reserved bits 3–6 of set IV are supplied to be stored in register 1303 for use as desired. Presently, the reserved bits are not being used but are being reserved for future use. The C-bits, namely bits C1 and C2 in sets II, III and IV, are supplied to be stored in register 1304. The C1 and C2 bits are checked in logic 1305 to determine if the corresponding stuff bits, S1 and S2, respectively, are a data bit or a stuff bit. As indicated above, if all three or two of the C1 bits or C2 bits are logical 0, the corresponding stuff bit is a data bit and if all three or two of the C1 bits or C2 bits are logical 1, the corresponding stuff bit is a stuff bit. The data bit/stuff bit indication is supplied to timing generator 1202 for use as described above.

Referring again to FIG. 12 and the channel frame format in FIG. 4, timing generator 1202 controls write counter 1203 to remove the overhead bits and other unused bit positions by inhibiting writing bits from demultiplexer unit 1206 into elastic store 1204 during those bit intervals. Thus, write counter 1203 is inhibited from writing bits 1–14 and 16 in sets I, II and III and bits 1–13 in set IV and S1 and S2 in set IV when the corresponding C-bits indicate a stuff bit. Consequently, only DS1 data is written into elastic store 1204. The DS1 data is then read out of elastic store 1204 at the 1.544 Mb/sec rate under control of read counter 1207.

Figure 14:
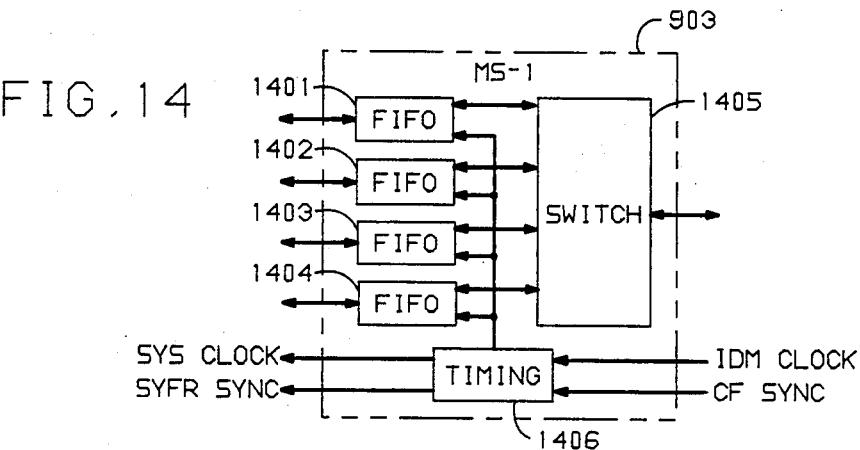
FIG. 14 depicts in simplified block diagram form details of multiplexer/demultiplexer and switch (MS-1) used in DLU-1 of FIG. 9.

FIG. 14 depicts in simplified block diagram form details of MS-1 used in FIG. 9. Accordingly, shown are first-in first-out (FIFO) registers 1401, 1402, 1403 and 1404, switch 1405 and timing unit 1406. Again, although the circuit paths to and from FIFOs 1401–1404 and switch 1405 are shown as bidirectional, it will be apparent to those skilled in the art that appropriate connections are necessary to the circuit inputs and outputs.

In the transmit direction for MS-1, 16-bit words are obtained from corresponding ones of the SYFR 902 synchronizer units which are temporarily stored in FIFOs 1401–1404. Switch 1405 then switches or selects a 16-bit word from each of FIFOs 1401–1404 in a predetermined sequence. That is, one 16-bit word is selected from FIFO 1401, then one 16-bit word is selected from FIFO 1402, then one 16-bit word is selected from FIFO 1403 and, finally, one 16-bit word is selected from FIFO 1404. This sequence is continuously repeated and the words are supplied in serial form in the sequence at a predetermined rate to IDM 202 (FIG. 2), in this example, 6.656 Mb/sec.

In the receive direction for MS-1, 16-bit words are supplied from IDM 202 (FIG. 2) in the channel frame format of FIG. 4 in serial sequence and supplied by switch 1405 to corresponding ones of FIFOs 1401–1404. The outputs from FIFOs 1401–1404 are supplied at the DLU-1 SYS CLOCK rate of 1.664 Mb/sec to appropriate ones of SYFRs 902 (FIG. 9) desynchronizer units.

Timing unit 1406 is responsive to the IDM CLOCK signal of, in this example, 6.656 Mb/sec, and the channel frame sync signal, CF SYNC, of, in this example, 2kHz, to generate DLU-1 SYS CLOCK which is 1.664 Mb/sec and SYFR SYNC which is a modified version of CF SYNC and is a 2 kHz signal for DLU-1.

Figure 15:
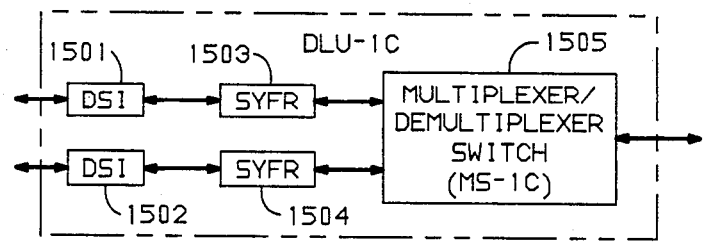
FIG. 15 shows in simplified block diagram form details of DLU-1C used in the DLM of FIG. 2.

FIG. 15 shows in simplified block diagram form details of DLU-1C employed to interface up to two DS1C signals in DLM 201 of FIG. 2. Again, the circuit paths are shown as bidirectional for simplicity and clarity of description and it will be apparent to those skilled in the art that appropriate circuit connections are needed for the transmit and receive directions. Accordingly, shown are digital signal interface (DSI) units 1501 and 1502, SYFRs 1503 and 1504 and multiplexer/demultiplexer and switch (MS-1C) 1505. DLU-1C is employed to interface up to two DS1C incoming signals to IDM 202 (FIG. 2). DSIs 1501 and 1502 each include a phase-locked loop for recovering the DS1C clock signal of 3.152 Mb/sec, a bipolar-to-unipolar converter and vice versa, an equalizer for the equalization of gain and/or delay distortion, performance monitoring apparatus, provision for DS1C loopback maintenance, etc. Such digital signal interfaces are known in the art. In the receive direction, the DISs 1501 and 1502 are employed to convert the DS1C PCM signal to unipolar and to recover the DS1C clock signal of 3.152 Mb/sec. The unipolar DS1C signals and clock are supplied from DSI 1501 and DSI 1502 to SYFR 1503 and SYFR 1504, respectively. In the transmit direction, each DSI converts the unipolar reconstructed DS1C signal to bipolar and supplies the DS1C signal at the 3.152 Mb/sec rate to an appropriate outgoing transmission line.

SYFRs 1503 and 1504 each include a synchronizer and a desynchronizer essentially identical in structure and operation to those shown in FIGS. 10–13 and described above in relation to the DLU-1. The only differences are that the synchronizer formats the DS1C signal into the channel frame format of FIG. 5, the desynchronizer deformats the channel frame format of FIG. 5 to obtain a reconstructed unipolar DS1C signal, the SYS CLOCK signal and SYFR SYNC signal. It is noted from FIG. 5 that the DS1C data requires the use of additional data bit positions in the channel frame format as compared to the DS1 signal and that the stuff bit positions S1 and S2 are bits 10 and 11 of set IV. Again, if the stuff bits are included as data bits, the DS1C signal uses 789 data bit positions in the channel frame format.

The SYS CLOCK signal for DLU-1C is, in this example, 3.328 Mb/sec, while the SYFR SYNC is 4 kHz. Thus, it is seen that the SYS CLOCK and SYFR SYNC for DLU-1C are twice the DLU-1 rates. Consequently, two channel frames per DS1C line are generated during each common channel frame interval of 0.5 milliseconds.

MS-1C 1505 in the transmit direction supplies 16-bit digital words from SYFRs 1503 and 1504 in a predetermined sequence to IDM 202 (FIG. 2). To this end, a 16-bit digital word is supplied from SYFR 1503 and then a 16-bit word is supplied from SYFR 1504. This sequence is repeated and the 16-bit words are supplied from DLU-1C to IDM 202 (FIG. 2) in serial form at a 6.656 Mb/sec rate. An alternative is to supply two 16-bit words from SYFR 1503 and then two 16-bit words from SYFR 1504 provided, however, that such a sequence is employed in the receive direction.

Figure 5:
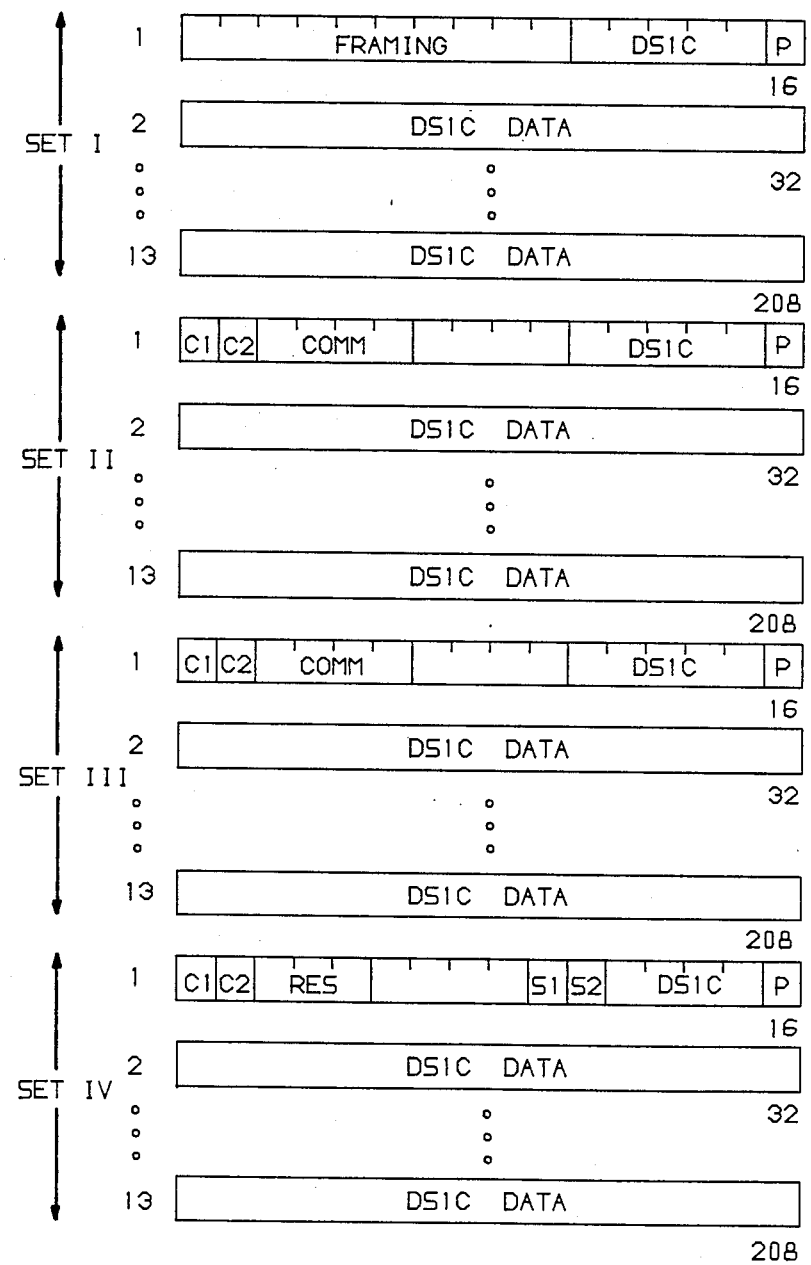
FIG. 5 illustrates the channel frame format of the invention used for DS1C signals in DLU-1C of FIG. 2.

In the receive direction, MS-1C 1505 supplies 16-bit digital words received from IDM 202 in the DLU-1C channel frame format shown in FIG. 5 to SYFRs 1503 and 1504. Again, the sequence which is repeated is one 16-bit digital word to SYFR 1503 and then one 16-bit word to SYFR 1504. That is to say, the 16-bit words are supplied to alternate ones of SYFRs associated with the two DS1C signals assigned to a DLU-1C. Again, an alternative is to supply two 16-bit words to SYFR 1503 and, then, two 16-bit words to SYFR 1504.

Figure 16:
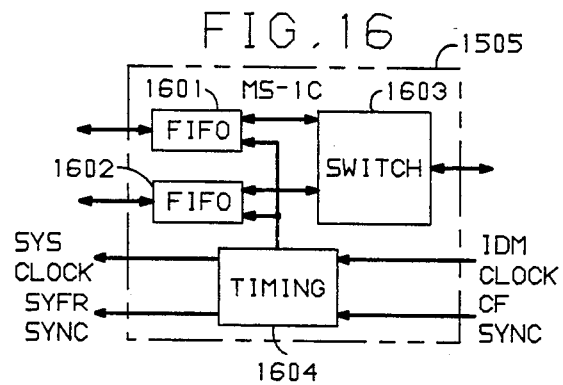
FIG. 16 depicts in simplified block diagram form details of MS-1C used in DLU-1C of FIG. 15.

FIG. 16 shows in simplified block diagram form details of MS-1C 1505 of FIG. 15. Accordingly, shown are FIFOs 1601 and 1602, switch 1603 and timing unit 1604. In the transmit direction, 16-bit digital words from the channel frame format for DLU-1C of FIG. 5 are supplied to FIFOs 1601 and 1602 from SYFRs 1503 and 1504 (FIG. 15), respectively. Switch 1603 supplies the 16-bit digital words to IDM 202 (FIG. 2) in a predetermined repeated sequence, one example being one word from FIFO 1601 and then one word from FIFO 1602. The words are supplied in serial form in the sequence at the IDM CLOCK rate of 6.656 Mb/sec.

In the receive direction, the digital words are supplied in serial form to switch 1603 from IDM 202 (FIG. 2) from the words in the IS format (FIG. 8) assigned to the two DS1C signals and this particular DLU-1C. In turn, switch 1603 supplies the digital words in sequence to FIFO 1601 and FIFO 1602. The digital words from FIFOs 1601 and 1602 are then supplied to SYFRs 1503 and 1504 (FIG. 15), respectively, for deformatting the channel frame for DLU-1C.

Timing unit 1604 is responsive to the IDM CLOCK and CF SYNC from IDM 202 to generate the SYS CLOCK SYFR SYNC signals for DLU-1C. In this example, the DLU-1C SYS CLOCK is 3.328 Mb/sec and SYFR SYNC is 4 kHz.

An alternative to using one SYFR circuit for each DS1C signal which genrates channel frames at the 4 kHz rate is to use two SYFR circuits for each DS1C signal each of which generates channel frames at the 2 kHz rate.

Figure 17:
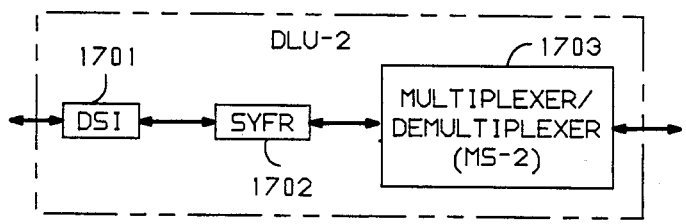
FIG. 17 shows in simplified block diagram form details of DLU-2 used in the DLM of FIG. 2.

FIG. 17 depicts in simplified block diagram form details of DLU-2 which generates the channel frame format for a DS2 signal and interfaces it to IDM 202 (FIG. 2). The bidirectional circuit paths are shown for simplicity and clarity of description. It will be apparent to those skilled in the art that appropriate circuit connections are needed for the transmit and receive directions. Shown are digital signal interface (DSI) 1701, SYFR 1702 and multiplexer/demultiplexer (MS-2) 1703. DSI 1701 interfaces the incoming and outgoing lines for DS2 signals and includes a phase-locked loop for recovering the DS2 clock signal of 6.312 Mb/sec, a bipolar-to-unipolar converter and vice versa, an equalizer for equalization of gain and/or delay distortion, performance monitoring apparatus, etc. Such digital interfaces are known in the art. In the incoming direction, DSI 1701 is responsive to the incoming DS2 signal in the B6ZS bipolar format to generate an incoming DS2 clock signal of 6.312 Mb/sec and to convert the incoming bipolar signal to unipolar. The unipolar DS2 signal and clock are then supplied to SYFR 1702. In the outgoing direction, DSI 1701 is responsive to a DS2 clock signal and unipolar DS2 data from SYFR 1702 to convert the data to the B6ZS bipolar format for transmission on an outgoing transmission line.

Figure 6:
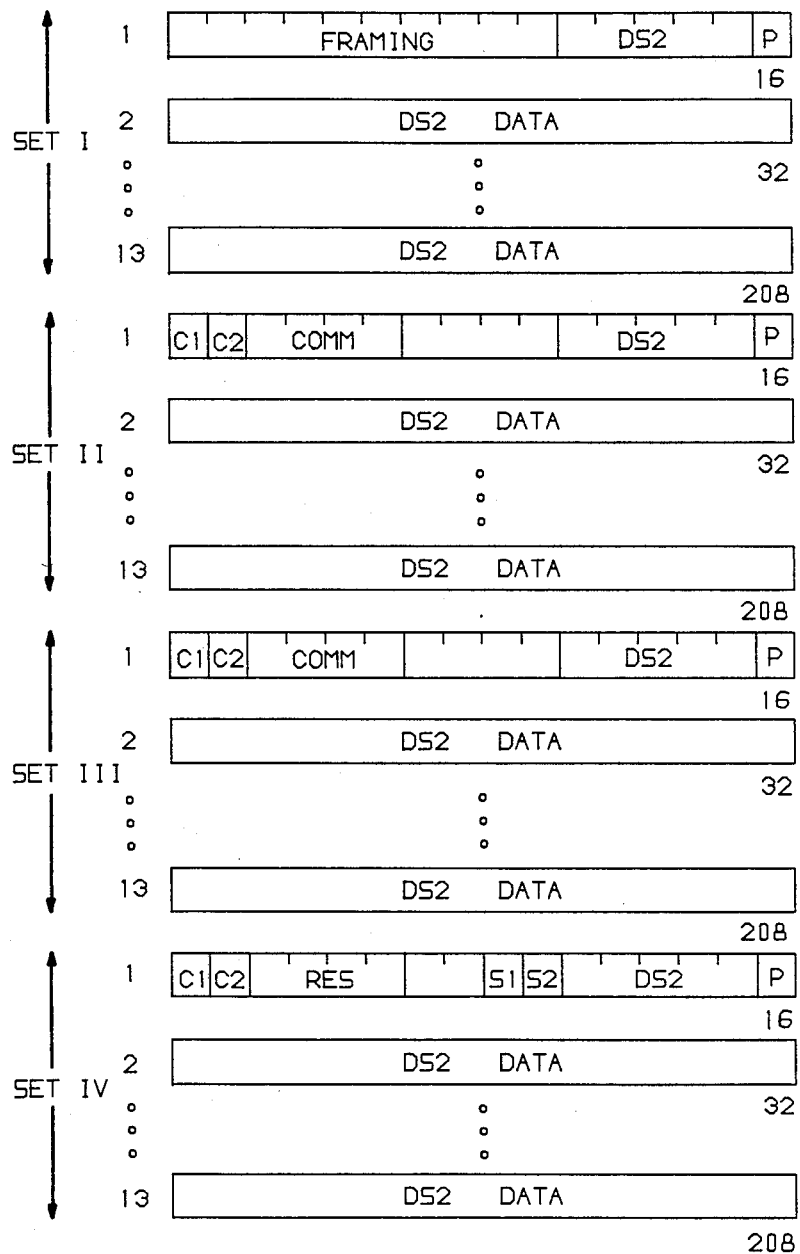
FIG. 6 illustrates the channel frame format of the invention used for DS2 signals in DLU-2 of FIG. 2.

SYFR 1702 is essentially identical in both structure and operation of the SYFR shown in FIGS. 10-13 and described above in relationship to the DLU-1. The only differences are that the SYFR synchronizer formats the incoming DS2 signal into the channel frame format shown in FIG. 6, the SYFR desynchronizer deformats the channel frame format shown in FIG. 6 to obtain a reconstructed unipolar DS2 signal, the SYS CLOCK signal and SYFR SYNC signal. It is noted from the DLU-2 channel frame of FIG. 6 that the DS2 data requires the use of additional data bit positions as compared to the DS1 signals as shown in FIG. 4 for DLU-1 and that the stuff bit positions S1 and S2 are in bits 9 and 10 of set IV (FIG. 6). If the stuff bits are included as data bits, the DS2 signal uses 790 data bit positions in the channel frame format.

In this example, DLU-2 SYS CLOCK is 6.656 Mb/sec and SYFR SYNC is 8 kHz. These rates are four times DLU-1 rates for DS1 signals. Consequently, four channel frames of DS2 data, which are equivalent of four DS1 channel frames, are generated during each common channel frame interval of 0.5 milliseconds.

MS-2 1703 in the trasmit mode supplies 16-bit digital words in serial form of IDM 202 (FIG. 2) at the 6.656 Mb/sec IS rate. In the receive mode, MS-2 1703 supplies 16-bit words received from IDM 202 in serial form to SYFR 1702 for deformatting from the word positions assigned to this DLU-2 in the IS format (FIG. 8).

Figure 18:
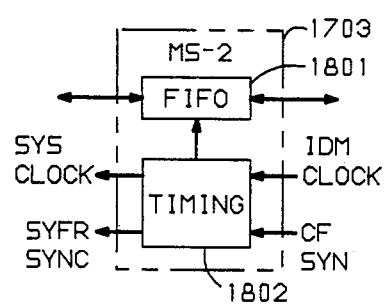
FIG. 18 depicts in simplified block diagram form details of MS-2 used in DLU-2 of FIG. 17.

FIG. 18 shows in simplified form details of MS-2 1703 of FIG. 17. Accordingly, shown is FIFO 1801 and timing unit 1802. Again, in the transmit direction, 16-bit digital words from the DLU-2 channel frame format of FIG. 6 are obtained from SYFR 1702 (FIG. 17) and supplied in serial form via FIFO 1801 to IDM 202 (FIG. 2) at the 6.656 Mb/sec rate. In the receive direction, the 16-bit digital words are obtained from IDM 202 (FIG. 2) and supplied to FIFO 1801 in serial form at the 6.656 Mb/sec IS rate and, in turn, to SYFR 1702 (FIG. 17) for deformatting. Timing unit 1802 is responsive to the IDM CLOCK and CF SYNC signals to generate the DLU-2 SYS CLOCK of 6.656 Mb/sec and SYFR SYNC of 8 kHz.

An alternative to using one SYFR circuit for DS2 signals which generates channel frames at 8 kHz rate is to use four SYFR circuits each of which generates channel frames at the 2 kHz rate.

Figure 19:
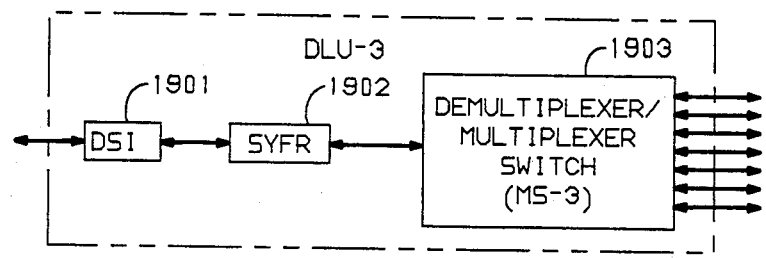
FIG. 19 shows in simplified block diagram form details of DLU-3 used in the DLM of FIG. 2.

FIG. 19 shows in simplified block diagram form details of DLU-3 of FIG. 2 employed for interfacing DS3 signals to IDM 202 (FIG. 2). Accordingly, shown are DSI 1901, SYFR 1902 and demultiplexer/multiplexer switch (MS-3) 1903. As for the other DLUs, DSI 1901 interfaces incoming DS3 signals to SYFR 1902 and outgoing DS3 signals from SYFR 1902 to a transmission line. DSI 1901 includes a phase-locked loop for recovering the DS3 clock signal of 44.736 Mb/sec, a bipolar-to-unipolar converter and vice versa, an equalizer for the equalization of gain and/or delay distortions, performance monitoring apparatus, etc. Such digital interfaces are known in the art. In the incoming direction, DSI 1901 converts the DS3 signals in a B3ZS coded bipolar format to unipolar and extracts the DS3 clock signal of 44.736 Mb/sec. The DS3 unipolar data and clock are supplied to SYFR 1902. In the outgoing direction, DSI 1901 converts the DS3 unipolar data from SYFR 1902 to the B3ZS coded bipolar format and supplies the reconstructed DS3 signal at the 44.736 Mb/sec rate to an appropriate transmission line.

Figure 7:
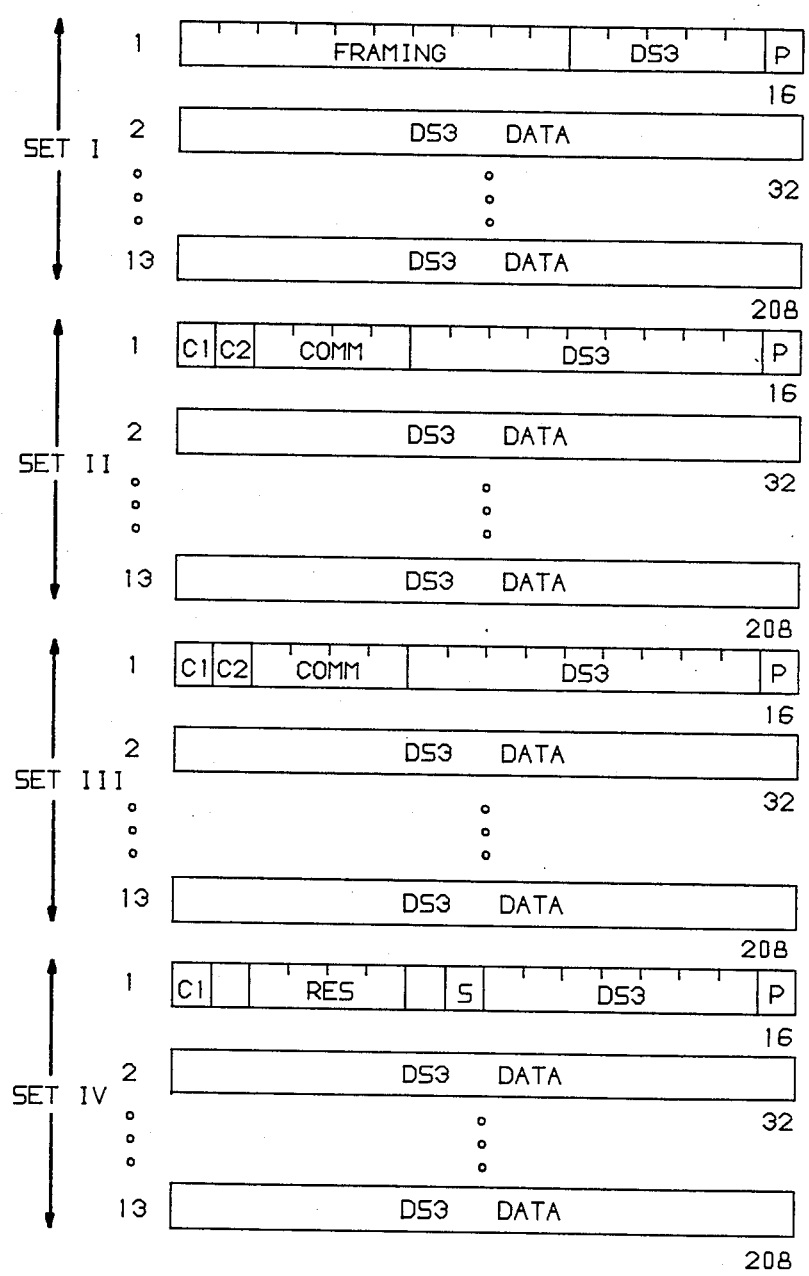
FIG. 7 illustrates the channel frame format of the invention used for DS3 signals in DLU-3 of FIG. 2.

SYFR 1902 is essentially identical to the SYFR shown in FIGS. 10-13 and described above in relationship to the DLU-1. The only differences are that the SYFR 1902 synchronizer formats the incoming DS3 unipolar data into the DLU-3 channel frame format shown in FIG. 7, the SYFR desynchronizer deformats the DLU-3 channel frame format of FIG. 7 to obtain a reconstructed unipolar DS3 data, the SYS CLOCK signal and SYFR SYNC signal. It is noted from FIG. 7 that the DS3 data requires the use of additional data bit positions as compared to the DS1, DS1C and DS2 signals and that only one stuff bit position S is used in bit 8 of set IV (FIG. 7). Additionally, only five of the stuff indicating bits are used. Thus, when three or more of the five C-bits (three C1 and two C2) are logical 1, the S bit is a stuff bit and when three or more of the C-bits are logical 0, the stuff bit S is a data bit. The unused C-bit (C2 is set IV) and the unused bit at bit position 7 of set IV can be used as additional data channels, or additional communications channels, or can be merged into the reserved bit space in set IV as desired. The use of five C-bits and positive stuffing insures greater accuracy for the higher bit rate DS3 signal. If the stuff bit is included as a data bit, the DS3 signal uses 799 data bit positions in the channel frame format.

In this example, DLU-3 SYS CLOCK is 46.592 Mb/sec and SYFR SYNC is 56 kHz. Consequently, twenty-eight channel frames of DS3 data, which are the equivalent of 28 DS1 channel frames, are generated during each common channel frame interval of 0.5 milliseconds.

MS-3 1903 in the transmit direction supplies 16-bit digital words from SYFR 1902 over seven circuit paths to IDM 202 (FIG. 2). Each of the seven circuit paths supplies the words at the IDM CLOCK rate of 6.656 Mb/sec. The 16-bit words are supplied via MS-3 1903 in a prescribed sequence as shown in FIG. 2. In the receive direction, MS-3 1903 is supplied with the 16-bit words received from IDM 202 in serial form over the seven circuit paths in the prescribed sequence from the word positions assigned to this DLU-3 in the IS format (FIG. 8). MS-3 1903 multiplexes the 16-bit words from the seven lines into a single serial signal which is supplied to SYFR 1702 at the SYS CLOCK rate of 46.592 Mb/sec for deformatting. An alternative to employing seven circuit paths would be to use a single circuit path which transfers the 16-bit words to and from MS-3 1903 at the 46.592 Mb/sec rate.

Figure 20:
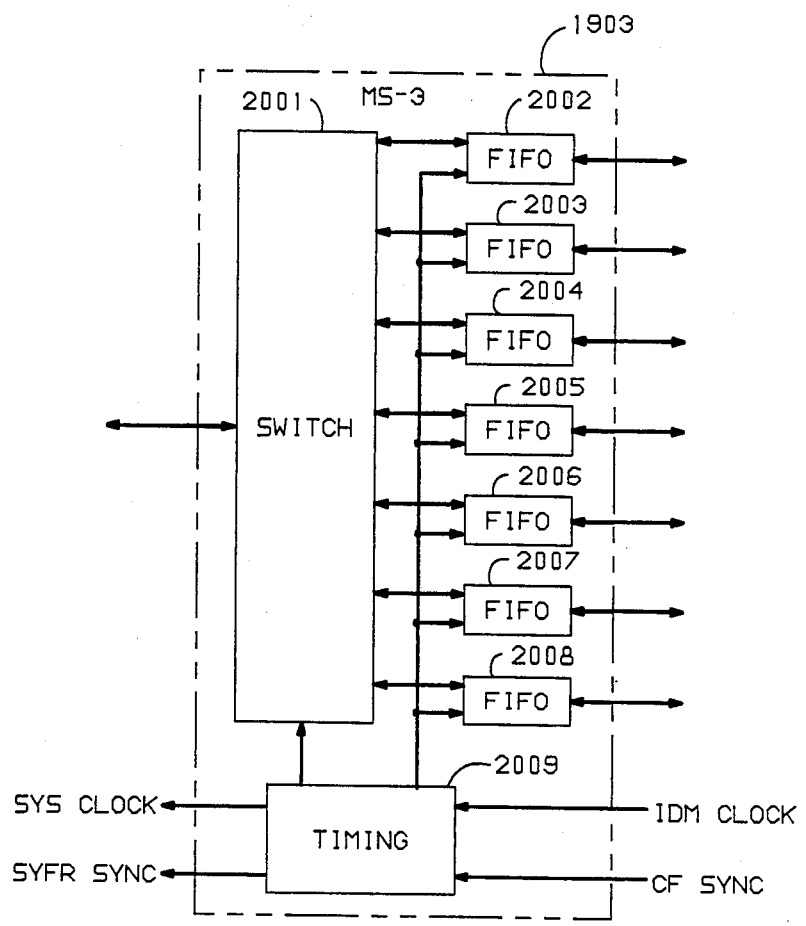
FIG. 20 depicts in simplified block diagram form MS-3 used in DLU-3 of FIG. 19.

FIG. 20 shows in simplified block diagram form details of MS-3 1903 of FIG. 19. Shown are switch 2001, FIFOs 2002 through 2008, and timing unit 2009. In the transmit direction, switch 2001 is supplied with the 16-bit digital words from the channel frames (FIG. 7) formed in SYFR 1902 and supplies the 16-bit words in sequence to FIFOs 2002 through 2008. Thus, by way of an example, a first 16-bit word from a DLU-3 channel frame is supplied to FIFO 2002, the second word to FIFO 2003, the third word to FIFO 2004, the fourth word to FIFO 2005, the fifth word to FIFO 2006, the sixth word to FIFO 2007 and, finally, the seventh word to FIFO 2008. This sequence, i.e., of supplying a 16-bit word to each of FIFOs 2002-2008, is repeated for the remainder of the words in all the DLU-3 channel frames during the common channel frame interval. The digital words are outputted from FIFOs 2002-2008 to IDM 202 (FIG. 2) at the IDM CLOCK rate of 6.656 Mb/sec.

In the receive direction the 16-bit digital words from DLU-3 channel frames are supplied from word positions assigned to this DLU-3 in the IS format via IDM 202 (FIG. 2) to corresponding ones of FIFOs 2002-2008 at the IDM CLOCK rate of 6.656 Mb/sec. In turn, switch 2001 supplies the word outputs from FIFOs 2002-2008 to SYFR 1902 desynchronizer in serial form at the SYS CLOCK rate of 46.592 Mb/sec for deformatting. Again, the switching sequence is to take the 16-bit digital words in a predetermined order beginning with the output from FIFO 2002 through FIFO 2008.

Timing unit 2009 is responsive to IDM CLOCK and CF SYNC signals to generate the DLU-3 SYS CLOCK of 46.592 Mb/sec and SYFR SYNC of 56 kHz/sec. The IDM CLOCK signal clocks FIFOs 2002-2008 and DLU-3 SYS CLOCK clocks switch 2001.

Although the input and output sequence for DLU-3, in this example, is to supply one 16-bit word to each of the seven circuit paths, an alternative approach would be to supply four words to each line in sequence. Additionally, if desired, seven SYFR circuits could be employed and arranged in similar fashion to the DLU-2 for generating four channel frames each during a common channel frame interval of 0.5 milliseconds. Another alternative would be to use 28 SYFR circuits and generate 28 separate DLU-3 channel frames during the common channel frame interval. Thus, the channel frame repetition rate associated with each of the 28 SYFRs would be 2 kHz. Still another alternative would be to use a single circuit path for supplying the 16-bit words to and from IDM 202 (FIG. 2). In such an instance, the words would be transmitted at 46.592 Mb/sec. It should be noted that if three DLU-3 units were employed which transmitted the words over one circuit path each, three circuit paths in total, one sequence could be to supply one word from (to) each of the DLUs, then a second word from (to) each of the DLUs, etc., until all 84 words were supplied.

Figure 21:
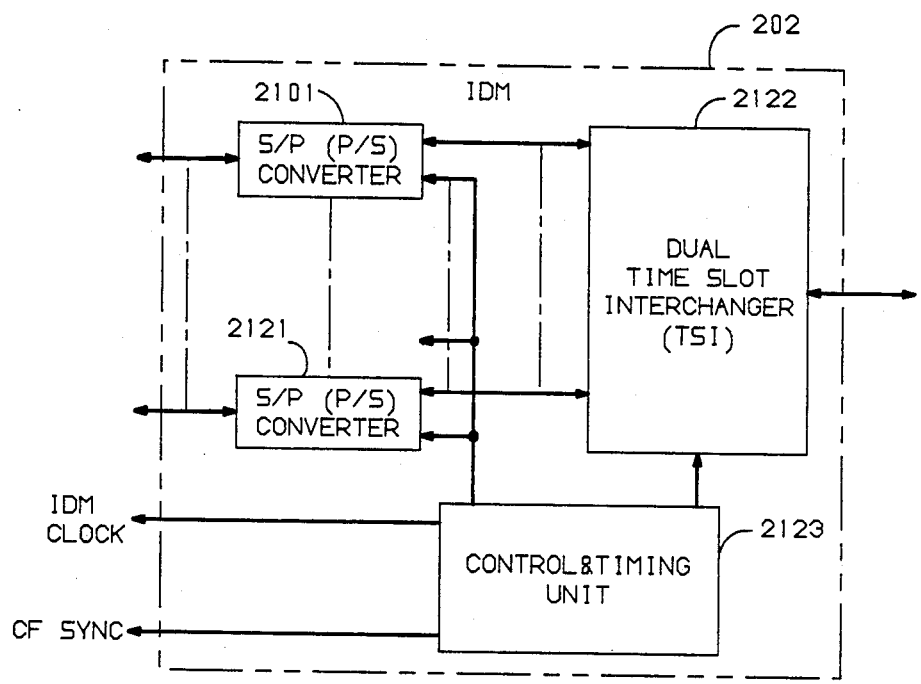
FIG. 21 shows in simplified block diagram form details of the IDM used in FIG. 2.

Details of IDM 202 (FIG. 2) are shown in simplfied block diagram form in FIG. 21. Accordingly, shown are serial-to-parallel (S/P) (parallel-to-serial (P/S)) converters 2101 through 2121, dual time slot interchanger (TSI) 2122 and control and timing unit 2123. Although the circuit paths are shown as bidirectional for simplicity and clarity of description, it will be apparent to those skilled in the art that appropriate circuit connections and devices are used for the transmit and receive directions.

In the transmit direction, digital words from the DLU units in DLM 201 (FIG. 2) are supplied at the IDM CLOCK rate of 6.656 Mb/sec over a circuit path to a corresponding one of serial-to-parallel (S/P) converters 2101 through 2121. For DLU-3, the digital words for DS3 channel frames are supplied over seven lines to seven S/P converters. In this example, S/P converters 2101-2121 convert the serial words into parallel form which are then supplied to time slot interchanger (TSI) 2122. Note that if a single circuit path is employed for DLU-3, then the number of S/P converters would be different and the timing for the S/P converters associated with DLU-3 units would be the 46.592 Mb/sec instead of the IDM CLOCK of 6.656 Mb/sec. TSI 2122 includes a plurality of RAM memory units into which the 16-bit words are written from S/P converters 2101 through 2121 in a predetermined mapped format depending on the mix of the signals from DLM 201 (FIG. 2) under control of control and timing unit 2123. The words are read from TSI 2122 also under control of control and timing unit 2123 in the IS format as shown in FIG. 8. The digital words from DLM 201 (FIG. 2) are written into TSI 2122 and, then, read out in a predetermined pattern determined by the type of DLU units in DLM 201. Use of a TSI facilitates inserting the digital words in desired data word positions in the IS format. In this example, however, TSI 2122 does a simple linear mapping, i.e., the first word from DLM 201 is inserted in the first data word position of the IS format and so on through data word position 84. Such TSI units and writing digital words into memory and reading the digital words out in a predetermined mapped format is well known in the art. See, for example, U.S. Pat. No. 4,298,977 issued to R. P. Abbot et al on Nov. 3, 1981 and U.S. Pat. No. 4,035,584 issued to J. W. Lurtz on July 12, 1977.

In this example, DLM 201 includes three DLU-1 units, three DLU-1C units, one DLU-2 unit and two DLU-3 units. Thus, in the IS format of FIG. 8 and referring to FIG. 2, IS data words 1 to 12 each include a digital word from the 12 respective DS1 signals, IS data words 13-24 include digital words from the six respective DS1C signals, IS data words 25-28 include digital words from the corresponding DS2 signal, IS data words 29-56 include data words from one DS3 signal and IS data words 57-84 include data words from the other DS3 signal. The four IS overhead word positions are used by the transmission system as needed for framing information, protection switching information, alarms and the like. The framing information is commonly employed in digital transmission systems to frame align received signals. Thus, the IS signal supplied to IDM 202 (FIG. 2) is considered in frame alignment and the individual data word positions are readily identifiable. The IS frame repetition rate is 104 kHz and the IS signal is outputted at a 146.432 Mb/sec rate.

Figure 22:
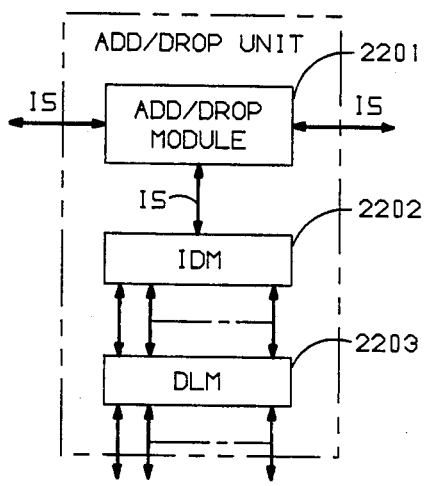
FIG. 22 depicts in simplified block diagram form details of the add/drop unit used in FIG. 2.
Figure 23:
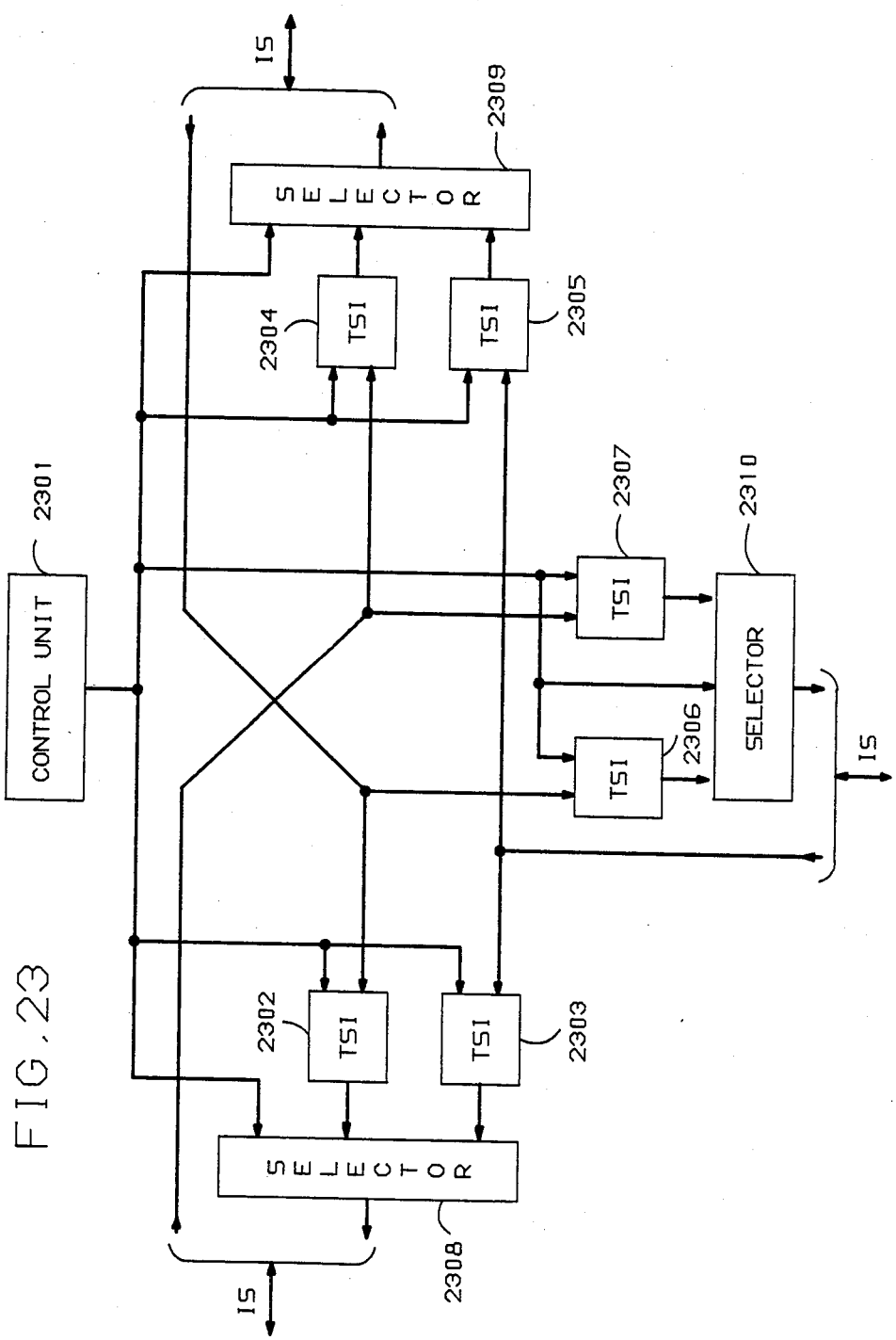
FIG. 23 shows in simplified block diagram form details of the add/drop module used in the add/drop unit of FIG. 22.

FIG. 22 shows in simplified block diagram form details of an add/drop unit which may be advantageously employed in the system of FIG. 1 to add and/or drop one or more of the digital signals in the transmission hierarchy, namely, DS1, DS1C, DS2 or DS3. Accordingly, shown are add/drop module 2201, IDM 2202 and DLM 2203. Details of add/drop module 2201 are shown in FIG. 23 and described below. Add/drop module 2201 is employed for supplying and receiving appropriate ones of the digital signals to and from, respectively, IDM 2202 in the IS format of FIG. 8. IDM 2202 is essentially identical in structure and operation to IDM 202 (FIG. 2) described above. The difference is related to the data words included in the IS signals and the data words to be supplied to and received from DLM 2203. DLM 2203 is essentially identical in structure and operation to DLM 201 (FIG. 2) described above. The differences are in the DLU units which are used depending on the mix of signals to be added and/or dropped at the specific terminal. For example, if DS1 signals are to be added or dropped, an appropriate number of DLU-1 units are used. As indicated above, a DLU-1 interfaces up to four DS1 signals to an IDM. Similarly, if DS1C signals are to be added or dropped, an appropriate number of DLU-1C units are used. Each DLU-1C 1C unit interfaces up to two DS1C signals to an IDM. If DS2 signals are to be added or dropped, an appropriate number of DLU-2 units are used. Each DLU-2 unit interfaces one DS2 signal. IF DS3 signals are to be added or dropped, an appropriate number of DLU-3 units are used. Each DLU-3 unit interfaces one DS3 signal. Again, it is noted that the unique IS frame format including the grouping of the IS data words for each of the digital signals allows, in accordance with an aspect of the invention, easy adding and/or dropping at an intermediate terminal. Any mix of the digital signals may be added or dropped up to 84 DS1 equivalent signals. However, if all 84 equivalent DS1 signals are added or dropped, the terminal would be considered a bank terminal and not an add/drop terminal. Because of the unique one-step multiplexing (demultiplexing) associated with generating the IS frame format and the grouping of the IS data words associated with the digital signals, the particular signals or mix of signals added and/or dropped at a particular terminal is easily altered. The DLM 2203 needs only to be equipped with the proper DLU units and the add/drop module 2201 unit controlled to add or drop the IS data words into or out of, respectively, appropriate word slots of the incoming and outgoing IS frames.

FIG. 23 shows in simplified block diagram for details of add/drop module 2201. Accordingly, shown are control unit 2301, time slot interchangers (TSIs) 2302, 2303, 2304, 2305, 2306 and 2307 and digital selectors 2308, 2309 and 2310. TSIs 2304, 2305 and 2307 and digital selectors 2309 and 2310, under control of control unit 2301, add and/or drop data words to and/or from, respectively, the IS signal in a first direction of transmission. Similarly, TSIs 2302, 2303 and 2306 and digital selectors 2308 and 2310, also under control of control unit 2301, add and/or drop data words to and/or from, respectively, the IS signal in a second direction of transmission. Digital selector 2310, under control of control unit 2301, selects, i.e., obtains, the IS data words for corresponding digital signals being dropped from TSIs 2306 and 2307 and, hence, from the IS signals being tranmitted in the first and second directions of transmission, to be supplied to IDM 2202 (FIG. 22). Similarly, digital selector 2308 selects the IS data words corresponding to a digital signal or signals from TSI 2303 to be added, i.e., combined, to those being transmitted in the second direction of transmission from TSI 2302. Additionally, selector 2308 is controlled to not select data words in the IS signal of digital signals being dropped. Digital selector 2309 selects the IS data words corresponding to a digital signal or signals from TSI 2305 to be combined, i.e., added, with those being transmitted in the first direction of transmission from TSI 2304. Additionally, selector 2309 is controlled to not select data words in the transmission signal of digital signals being dropped. TSI 2304 is used to interchange IS data words in the data word position of the incoming IS signal in the first direction of transmission so that the words remaining in the IS signal after dropping words are in appropriate data word positions for supplying to digital selector 2309. Similarly, TSI 2305 is used to interchange the data word positions of the words to be added to be in appropriate word positions of the IS signal to be transmitted and, in turn, to IDM 2202 (FIG. 22). The time slot interchanging may be required, for example, because the digital signal to be applied to the first direction of transmission occupies the same time slot(s) or data word position(s) as a digital signal being already transmitted in the first direction of transmission. TSIs 2302 and 2303 are employed for performing a similar function in the second direction of transmission. TSIs 2307 and 2306 are used to exchange the word positions of the data words being dropped from the first and second directions of transmission, respectively. Again, the time slot interchanging is needed when data words being dropped from both directions of tranmission occupy the same data word position in the IS signal format and, additionally, to insert the words into data word positions of the IS signal being supplied to IDM 2202 (FIG. 22) which correspond to the DLU units included in DLM 2203 (FIG. 22). TSIs 2303 and 2305 perform a similar function for the IS data words being added. These data words must be added into the IS signal format where space is available and to corresponding groups of data word positions assigned to the added signals for transmission to a remote terminal. The TSIs also perform time alignment of the IS signals. This time alignment is commonly achieved by employing memory units in TSIs 2302 through 2307 as elastic stores. The mapping of the data words into and out of TSIs 2302-2307 is achieved in well-known fashion under control of control unit 2301. The digital selectors are employed because the data words are added to or dropped from the IS signal repetitive frame in groups which, as described above, have a different number of data words depending on the particular digital signal being added or dropped.

In operation of a particular system employing aspects of the invention, the terminals employed will be initially set up by craftspeople for interfacing the appropriate digital signals assigned to the terminal. Once set up, it is anticipated that the system will remain in the particular configuration for some extended length of time. If desired, the configuration may be modified to meet changing and/or increasing demands for service. It is also anticipated that in the future such setup and/or changes in the system configuration will be achieved automatically under control of information provided via an operations support system and local processors. Control information for the automatic system setup or changes therein can be transmitted in the overhead data word positions of the IS signal format.

It must be understood at this point that the foregoing disclosure is merely illustrative of the principles of the invention and numerous modifications or alterations may be devised by those skilled in the art.

What is claimed is:

1. Apparatus for adding at least one digital signal having one of one or more digital transmission bit rates to a transmission signal formed by combining a plurality of digital signals of the one or more digital transmission bit rates, the apparatus comprising:

at least one means for formatting said at least one digital signal being added into channel frames having a predetermined number of digital words, said at least one formatting means including means for generating a number of said channel frames for said at least one digital signal being added during a first predetermined interval, said number of channel frames being dependent on a predetermined relationship of the digital transmission bit rate of said at least one digital signal being formatted and a transmission bit rate of one of a predetermined set of digital signals;

means for supplying a predetermined number of digital words from said channel frames for said at least one digital signal being added during a predetermined frame interval of said transmission signal and for inserting said number of supplied digital words for said at least one digital signal being added into a group of data word positions of a repetititve transmission signal frame during said predetermined transmission signal frame interval, said number of digital words in said group for said at least one digital signal being added being dependent on the number of channel frames that have been gernerated therefore during said first predetermined interval; and means for combining data words from said at least one digital signal group of data word positions with data words in a repetitive frame of said transmission signal, wherein said at least one digital signal is added to said transmission signal.

2. The invention as defined in claim 1 wherein said combining means includes means for controllably selecting data words from said at least one group of data word positions of said at least one digital signal being added and for controllably selecting data words from said transmission signal repetitive frame so that said at least one digital signal is added to said transmission signal.

3. The invention as defined in claim 2 wherein said combining means further includes means for controllably interchanging data words in the data word positions of said transmission signal frame.

4. The invention as defined in claim 1 wherein said combining means includes first means for controllably selecting data words from said at least one group of data word positions of said at least one digital signal being added and for controllably selecting data words from the repetitive frame of a transmission signal being transmitted in a first direction of transmission so that said at least one digital signal is added to said transmission signal being transmitted in the first direction of transmission.

5. The invention as defined in claim 4 wherein said combining means further includes second means for controllably selecting data words from said at least one group of data word positions of said at least one digital signal being added and for controllaby selecting data words from the repetitive frame of a transmission signal being transmitted in a second direction of transmission so that said at least one digital signal is added to said transmission signal being transmitted in the second direction of transmission.

6. The invention as defined in claim 5 wherein said combining means further includes first and second data word interchanging means in circuit with said first means for selecting, said first data word interchanging means being supplied with said transmission signal being transmitted in said first direction of transmission for controllably interchanging data words in data word positions in said transmission signal repetitive frame being transmitted in said first direction of transmission, said second data word interchanging means being supplied with the data words of said at least one digital signal being added for controllably interchanging the data words therefrom in data word positions relative to said transmission signal repetitive frame of the transmission signal being transmitted in said first direction of transmission.

7. The invention as defined in claim 6 wherein said combining means further includes third and fourth data word interchanging means in circuit with said second means for selecting, said third data word interchanging means being supplied with said transmission signal being transmitted in said second direction of transmission for controllably interchanging data words in data word positions in said transmission signal repetitive frame being transmitted in said second direction of transmission, said fourth data word interchanging means being supplied with the data words of said at least one digital signal being added for controllably interchanging the data words therefrom in data word positions relative to said transmission signal repetitive frame of the transmission signal being transmitted in said second direction of transmission.

8. The invention as defined in claim 1 wherein said predetermined set of digital signals includes a digital signal having a first predetermined transmission bit rate and wherein said number of channel frames generated for said at least one digital signal being added during said first predetemined interval and the number of digital words inserted by said supplying and inserting means in the group of data word positions of said transmission signal repetitive frame for said at least one digital signal during said predetermined transmission signal frame interval are directly dependent on the number of equivalent ones of said first transmission bit rate signal in said at least one digital signal.

9. The invention as defined in claim 8 wherein said first transmission bit rate signal is the one of the digital signals in said predetermined set of digital signals having the lowest transmission bit rate.

10. The invention as defined in claim 9 wherein said set of digital signals include at least the DS1 signal, DS1C signal, DS2 signal and DS3 signal.

11. The invention as defined in claim 10 wherein the number of said digital words inserted in said group of data word positions by said supplying and inserting means for each DS2 signal being added is one, for each DS1C signal being added is two, for each DS2 signal being added is four and for each DS3 signal being added is twenty-eight.

12. The invention as defined in claim 8 wherein said transmission signal repetitive frame includes a predetermined number of data word positions and a predetermined number of other word positions, said predetermined number of said data word positions in said transmission signal frame is a predetermined number of equivalent ones of said first transmission bit rate signal and wherein said supplying and inserting means includes means for inserting digital words supplied thereto into said transmission signal frame data word positions up to a number equal to said predetermined number of equivalent ones of said first transmission bit rate signal.

13. The invention as defined in claim 12 wherein said supplying and inserting means includes means for inserting said digital words into said data word positions in parallel form and means for controllably interchanging data word positions of said supplied digital words for insertion into the data word positions of said transmission signal frame.

14. Apparatus for dropping at least one digital signal having one of one or more digital transmission bit rates from a transmission signal formed by combining a plurality of digital signals of the one or more digital transmission bit rates, the transmission signal including a repetitive frame having a predetermined number of data word positions and a predetermined number of other word positions, the apparatus comprising:
   means for obtaining data words from at least one group of data word positions in said transmission signal repetitive frame corresponding to said at least one digital signal being dropped;
   at least one first means for extracting a predetermined number of digital words from the data word positions of said obtained at least one group and for supplying said number of extracted digital words during a frame interval of said transmission signal for said at least one digital signal being dropped from said transmission signal, the number of digital words extracted from said data word positions and supplied for said at least one digital signal being dropped being dependent on a predetermined relationship of the digital transmission bit rate of said at least one digital signal being dropped and a transmission bit rate of one of a predetermined set of digital signals,
   at least one means for deformatting information in said extracted and supplied digital words to obtain a reconstructed version of said at least one digital signal being dropped, said at least one deformatting means including means for framing on a framing pattern in said supplied digital words of said at least one digital signal being dropped to identify a channel frame therefore including a plurality of data bit positions and a plurality of other bit positions, second means for extracting data bits from predetermined data bit positions of said identified channel frame dependent on said at least one digital signal being reconstructed, said second extracting means including means for extracting said data bits from a number of said channel frames during a first predetermined interval dependent on said predetermined relationship of the digital transmission bit rate of said at least one digital signal being reconstructed and said transmission bit rate of said one of said predetermined set of digital signals.

15. The invention as defined in claim 14 wherein sid means for obtaining includes means for controllably selecting data words from data word positions in said transmission signal repetitive frame corresponding to said at least one group of data word positions of said at least one digital signal being dropped.

16. The invention as defined in claim 15 wherein said obtaining means further includes means for controllably interchanging data words in the data word positions of said transmission signal frame.

17. The invention as defined in claim 15 wherein said obtaining means further includes at least first data word interchanging means in circuit with said means for selecting, said at least first data word interchanging means being supplied with a transmission signal being transmitted in a first direction of transmission for controllably interchanging data words in data word positions in said transmission signal repetitive frame being transmitted in said first direction of transmission and wherein said selecting means controllably selects data words from data word positions in said transmission signal repetitive frame being transmitted in said first direction of transmission corresponding to said at least one digital signal being dropped.

18. The invention as defined in claim 17 wherein said obtaining means further includes means supplied with said transmission signal being transmitted in said first direction of transmission for controllably selecting data words to be transmitted in the transmission signal in said first direction so that said at least one digital signal is dropped therefrom.

19. The invention as defined in claim 15 wherein said obtaining means further includes second data word interchanging means in circuit with said means for selecting, said second data word interchanging means being supplied with a transmission signal being transmitted in a second direction of transmission for controllably interchanging data words in data word positions in said transmission signal repetitive frame being transmitted in said second direction of transmission and wherein said selecting means controllably selects data words from data word positions in said transmission signal repetitive frame being transmitted in said second direction of transmission coresponding to said at least one digital signal being dropped.

20. The invention as defined in claim 19 wherein said obtaining means further includes means supplied with said transmission signal being transmitted in said second direction of transmission for controllably selecting data words to be transmitted in the transmission signal in said second direction so that said at least one digital signal is dropped therefrom.

21. The invention as defined in claim 20 wherein said obtaining means further includes means supplied with said transmission signal being transmitted in said first direction of transmission for controllably selecting data words to be transmitted in the transmission signal in said first direction so that said at least one digital signal is dropped therefrom.

22. The invention as defined in claim 14 wherein said at least one first means for extracting and supplying extracts said number of digital words from a group of data word positions in said transmission signal repetitive frame dependent on said at least one digital signal being dropped.

23. The invention as defined in claim 22 wherein said predetermined set of digital signals includes a digital signal having a first predetermined transmission bit rate and wherein said number of channel frames from which data bits are extracted by said second extracting means for said at least one digital signal being dropped during said first predetermined interval and the number of digital signals extracted from a group of data word positions in said transmission signal repetitive frame by said at least one first means for said at least one digital signal being dropped during said transmission signal frame interval are directly dependent on a number of equivalent ones of said first transmission bit rate signal in said at least one digital signal being dropped.

24. The invention as defined in claim 23 wherein said first transmission bit rate signal is the one of the signals in said predetermined set of digital signals having the lowest transmission bit rate.

25. The invention as defined in claim 24 wherein said set of digital signals includes at least the DS1 signal, DS1C signal, DS2 signal and DS3 signal.

26. The invention as defined in claim 25 wherein the number of digital words being extracted from a group of data word positions of said transmission signal repetitive frame by said at least one first means for each DS1 signal being dropped is one, for each DS1C signal being dropped is two, for each DS2 signal being dropped is four and for each DS3 signal being droopped is twenty-eight.

27. The invention as defined in claim 23 wherein said predetermined number of said data word positions in said tranmission signal frame is a predetermined number of equivalent ones of said first transmission bit rate signal and wherein said at least one first means for extracting and supplying includes means for extracting digital words from said transmission signal frame data word positions up to a number of equal to said predetermined number of equivalent ones of said first transmission bit rate signal.

28. The invention as defined in claim 27 wherein said at least one first means for extracting and supplying includes means for extracting said digital words from said data word positions in parallel form and means for controllably interchanging data word positions of said supplied digital words for supplying the same to said at least one means for deformatting.

29. Apparatus for adding and dropping at least one digital signal having one of one or more digital transmission bit rates, the transmission signal including a repetitive frame having a plurality of data word positions and a plurality of other word positions, the apparatus comprising:

at least one means for formatting said at least one digital signal being added into channel frames having a predetermined number of digital words, said at least one formatting means including means for generating a number of said channel frames for said at least one digital signal being added during a first predetermined interval, said number of channel frames being dependent on a predetermined relationship of the digital transmission bit rate of said at least one digital signal being formatted and a transmission bit rate of one of a predetermined set of digital signals;

means for supplying a predetermined number of digital words from said channel frames for said at least one digital signal added during a predetermined frame interval of said transmission signal and for inserting said number of supplied digital words for said at least one digital signal being added into a group of data word positions of a repetitive transmission signal frame during said predetermined transmission signal frame interval, said number of digital words in said group for said at least one digital signal being added being dependent on the number of channel frames that have been generated therefore during said first predetermined interval;

means for combining data words from said at least one digital signal group of data word positions with data words in a repetitive frame of said transmission signal, wherein said at least one digital signal is added to said transmission signal;

means for obtaining data words from at least one group of data word positions in said transmission signal repetitive frame corresponding to said at least one digital signal being dropped;

at least one first means for extracting a predetermined number of digital words from the data word positions of said obtained at least one group and for supplying said number of extracted digital words during a frame interval of said transmission signal for said at least one digital signal being dropped from said transmission signal, the number of digital words extracted from said data word positions and supplied for said at least one digital signal being dropped being dependent on the predetermined relationship of the digital transmission bit rate of said at least one digital signal being dropped and the transmission bit rate of the one of the predetermined set of digital signals, at least one means for deformatting information in said extracted and supplied digital words to obtain a reconstructed version of said at least one digital signal being dropped, said at least one deformatting means including means for framing on a framing pattern in said supplied digital words of said at least one digital signal being dropped to identify a channel frame therefore including a plurality of data bit positions and a plurality of other bit positions, second means for extracting data bits from predetermined data bit positions of said identified channel frame dependent on said at least one digital signal being reconstructed, said second extracting means including means for extracting said data bits from a number of said channel frames during a first predetermined interval dependent on said predetermined relationship of the digital transmission bit rate of said at least one digital signal being reconstructed and said transmission bit rate of said one of said predetermined set of digital signals.

30. The invention as defined in claim 29 wherein said combining means includes means for controllably selecting data words from said at least one group of data word positions of said at least one digital signal being added and for controllably selecting data words from said transmission signal repetitive frame so that said at least one digital signal is added to said transmission signal, and wherein said means for obtaining includes means for controllably selecting data words from data word positions in said transmission signal repetitive frame corresponding to said at least one group of data words positions of said at least one digital signal being dropped.

31. The invention as defined in claim 30 wherein said combining means further includes means for controllably interchanging data words in the data word positions of said transmission signal frame, and wherein said obtaining means further includes means for contollably interchanging data words in the data word positions of said transmission signal frame.

32. The invention as defined in claim 29 wherein said combining means includes first means for controllably selecting data words from said at least one group of data word positions of said at least one digital signal being added and for controllably selecting data words from the repetitive frame of a transmission signal being transmitted in a first direction of transmission so that said at least one digital signal is added to said transmission signal being transmitted in the first direction of transmission, and wherein said obtaining means includes second means for controllably selecting data words from data word positions in said transmission signal repetitive frame being transmitted in said first direction of transmission corresponding to said at least one digital signal being dropped.

33. The invention as defined in claim 32 wherein said combining means further includes third means for controllably selecting data words from said at least one group of data word positions of said at least one digital signal being added and for controllably selecting data words from the repetitive frame of a transmission signal being transmitted in a second direction of transmission so that said at least one digital signal is added to said transmission signal being transmitted in the second direction of transmission, and wherein said second selecting means further controllably selects data words from data word positions in said transmission signal being transmitted in said second direction of transmission corresponding to at least one digital signal being dropped from said second direction of transmission.

34. The invention as defined in claim 33 wherein said combining means further includes first and second data word interchanging means in circuit with said first means for selecting, said first data word interchanging means being supplied with said transmission signal being transmitted in said first direction of transmission for controllably interchanging data words in data word positions in said transmission signal repetitive frame being transmitted in said first direction of transmission, said second data word interchanging means being supplied with the data words of daid at least one digital signal being added for controllably interchanging the data words therefrom in data word positions relative to said transmission signal repetitive frame of the transmission signal being transmitted in said first direction of transmission, and wherein said obtaining means further includes at least third data word interchanging means in circuit with said second means for selecting, said at least third data word interchanging means being supplied with a transmission signal being transmitted in a first direction of transmission for controllably interchanging data words in data word positions in said transmission signal repetitive frame being transmitted in said first direction of transmission and wherein said second selecting means controllably selects data words from data word positions in said transmission signal repetitive frame being transmitted in said first direction of transmission corresponding to said at least one digital signal being dropped.

35. The invention as defined in claim 34 wherein said combining means further includes fourth and fifth data word interchanging means in circuit with said third means for selecting, said fourth data word interchanging means being supplied with said transmission signal being transmitted in said second direction of transmission for controllably interchanging data words in data word positions in said transmission signal repetitive frame being transmitted in said second direction of transmission, said fifth data word interchanging means being supplied with the data words of said at least one digital signal being added for controllably interchanging the data words therefrom in data word positions relative to said transmission signal repetitive frame of the transmission signal being transmitted in said second direction of transmission, and wherein said obtaining means further includes sixth data word interchanging means in circuit with said second means for selecting, said sixth data word interchanging means being supplied with a transmission signal being transmitted in a second direction of transmission of controllably interchanging data words in data word positions in said transmission signal repetitive frame being transmitted in said second direction of transmission and wherein said second selecting means controllably selects data words from data word positions in said transmission signal repetitive frame being transmitted in said second direction of transmission corresponding to said at least one digital signal being dropped.

36. The invention as defined in claim 35 wherein said first selecting means controllably selects said data words to be transmitted in the transmission signal in said first direction so that said at least one digital signal is dropped therefrom.

37. The invention as defined in claim 36 wherein said third selecting means controllably selects said data words to be transmitted in the transmission signal in said second direction so that said at least one digital signal is dropped therefrom.

38. Apparatus for adding at least one digital signal having one of one or more digital transmission bit rates to a transmission signal formed by combining one or more digital signals of the one or more digital transmission bit rates, the apparatus comprising:

means for supplying a predetermined number of digital words from said at least one digital signal being added during a predetermined frame interval of said transmission signal and for inserting said number of supplied digital words for said at least one digital signal being added into a group of data word positions of a repetitive transmission signal frame during said predetermined transmission signal frame interval, said number of digital words in said group for said at least one digital signal being added being directly dependent on a number of equivalent ones of a digital signal having a first digital transmission bit rate in said at least one digital signal being added, said digital signal having a first digital transmission bit rate being one of a predetermined set of digital signals; and means for combining data words from said at least one digital signal group of data word positions with data words in a repetitive frame of said transmission signal, wherein said at least one digital signal is added to said transmission signal.

39. The invention as defined in claim 38 wherein said combining means includes means for controllably selecting data words from said at least one group of data word positions of said at least one digital signal being added and for controllably selecting data words from said transmission signal repetitive frame so that said at least one digital signal is added to said transmission signal.

40. The invention as defined in claim 39 wherein said combining means further includes means for controllably interchanging data words in the data word positions of said transmission signal frame.

41. The invention as defined in claim 38 wherein said combining means includes first means for controllably selecting data words from said at least one group of data word positions of said at least one digital signal being added and for controllably selecting data words from the repetitive frame of a transmission signal being transmitted in a first direction of transmission so that said at least one digital signal is added to said transmission signal being transmitted in the first direction of transmission.

42. The invention as defined in claim 41 wherein said combining means further includes second means for controllably selecting data words from said at least one group of data word positions of said at least one digital signal being added and for controllably selecting data words from the repetitive frame of a transmission signal being transmitted in a second direction of transmission so that said at least digital signal is added to said transmission signal being transmitted in the second direction of transmission.

43. The invention as defined in claim 42 wherein said combining means further includes first and second data word interchanging means in circuit with said first means for selecting, said first data word interchanging means being supplied with said transmission signal being transmitted in said first direction of transmission for controllably interchanging data words in data word positions in said transmission signal repetitive frame being transmitted in said first direction of transmission, said second data word interchanging means being supplied with the data words of said at least one digital signal being added for controllably interchanging the data words therefrom in data word positions relative to said transmission signal repetitive frame of the transmission signal being transmitted in said first direction of transmission.

44. The invention as defined in claim 43 wherein said combining means further includes third and fourth data word interchanging means in circuit with said second means for selecting, said third data word interchanging means being supplied with said transmission signal being transmitted in said second direction of transmission for controllably interchanging data words in data word positions in said transmission signal repetitive frame being transmitted in said second direction of transmisson, said fourth data word interchanging means being supplied with the data words of said at least one digital signal being added for controllably interchanging the data words therefrom in data word positions relative to said transmission signal repetitive frame of the transmission signal being transmitted in said second direction of transmission.

45. The invention as defined in claim 38 wherein said first transmission bit rate signal is the one of the digital signals in said predetermined set of digital signals having the lowest transmission bit rate.

46. The invention as defined in claim 46 wherein said set of digital signal includes at least the DS1 signal, DS1C signal, DS2 signal and DS3 signal, and wherein the number of said digital words inserted in said group of data word positions by said supplying and inserting means for each DS1 signal being added is one, for each DS1C signal eing added is two, for each DS2 signal being added is four and for each DS3 signal being added is twenty-eight.

47. The invention as defined in claim 38 wherein said transmission signal repetitive frame includes a predetermined number of data word positions and a predetermined number of other word positions, said predetermined number of said data word positions in said transmission signal frame is a predetermined number of equivalent ones of said first transmission bit rate signal and wherein said supplying and inserting means includes means for inserting digital words supplied thereto into said transmission signal frame data word positions up to a number equal to said predetermined number of equivalent ones of said first transmission bit rate signal.

48. Apparatus for dropping at least one digital signal having one of one or more digital transmission bit rates from a transmission signal formed by combining a plurality of digital signals of the one or more digital transmission bit rates, the transmission signal including a repetitive frame having a predetermined number of data word positions and a predetermined number of other word positions, the apparatus comprising:

means for obtaining data words from at least one group of data word positions in said transmission signal repetitive frame corresponding to said at least one digital signal being dropped;

at least one first means for extracting a predetermined number of digital words from the data word positions of said obtained at least one group and for supplying said number of extracted digital words during a frame interval of said transmission signal for said at least one digital signal being dropped from said transmission signal, the number of digital words extracted from said data word positions and supplied for said at least one digital signal being dropped being directly dependent on a number of equivalent ones of a digital signal having a first digital transmission bit rate in said at least one digital signal being dropped, said digital signal having a first digital transmission bit rate being one of a predetermined set of digital signals; and at least one means for deformatting information in said extracted and supplied digital words to obtain a reconstructed version of said at least one digital signal being dropped.

49. The invention as defined in claim 48 wherein said means for obtaining includes means for controllably selecting data words from data word positions in said transmission signal repetitive frame corresponding to said at least one group of data word positions of said at least one digital signal being dropped.

50. The invention as defined in claim 49 wherein said obtaining means further includes at least first data word interchanging means in circuit with said means for selecting, said at least first data word interchanging means being supplied with a transmission signal being transmitted in a first direction of transmission for controllably interchanging data words in data word positions in said transmission signal repetitive frame being transmitted in said first direction of transmission and wherein said selecting means controllably selects data words from data word positions in said transmission signal repetitive frame being transmitted in said first direction of transmission corresponding to said at least one digital signal being dropped.

51. The invention as defined in claim 50 wherein said obtaining means further includes means supplied with said transmission signal being transmitted in said first direction of transmission for controllably selecting data words to be transmitted in the transmission signal in said first direction so that said at least one digital signal is dropped therefrom.

52. The invention as defined in claim 49 wherein said obtaining means further includes second data word interchanging means in circuit with said means for selecting, said second data word interchanging means being supplied with a transmission signal being transmitted in a second direction of transmission for controllably interchanging data words in data word positions in said transmission signal repetitive frames being transmitted in said second direction of transmission and wherein said selecting means controllably selects data words from data word positions in said transmission signal repetitive frame being transmitted in said second direction of transmission corresponding to said at least one digital signal being dropped.

53. The invention as defined in claim 52 wherein said obtaining means further includes means supplied with said transmission signal being transmitted in said second direction of transmission for controllably selecting data words to be transmitted in the transmission signal in said second direction so that said at least one digital signal is dropped therefrom.

54. The invention as defined in claim 53 wherein said obtaining means further includes means supplied with said transmission signal being transmitted in said first direction of transmission for controllably selecting data words to be transmitted in the transmission signal in said first direction so that said at least one digital signal is dropped therefrom.

55. The invention as defined in claim 48 wherein said digital signal having said first digital transmission bit rate is the one of the signals in said predetermined set of digital signals having the lowest transmission bit rate.

56. the invention as defined in claim 55 wherein said set of digital signals includes at least the DS1 signal, DS1C signal, DS2 signal and DS3 signal, and wherein the number of digital words being extracted from a group of data word positions of said transmission signal repetitive frame by said at least one first means for extracting and supplying for each DS1 signal being dropped is one, for each DS1C signal being dropped in two, for each DS2 signal being dropped is four and for each DS3 signal being dropped is twenty-eight.

57. The invention as defined in claim 48 wherein said at least one first means for extracting and supplying includes means for extracting said digital words from said data word positions in parallel form and means for controllably interchanging data word positions of said supplied digital words for supplying the same to said at least one means for deformatting.

58. A method for adding at least one digital signal having one of one or more digital transmission bit rates to a transmission signal formed by combining one or more digital signals of the one or more digital transmission bit rates, comprising the steps of, supplying a predetermined number of digital words from said at least one digital signal being added during a predetermined frame interval of said transmission signal, inserting said number of supplied digital words for said at least one digital signal being added into a group of data word positions of a repetitive transmission signal frame during said predetermined transmission signal frame interval, said number of digital words in said group for said at least one digital signal being added being directly dependent on a number of equivalent ones of a digital signal having a first digital transmission bit rate in said at least one digital signal being added, said digital signal having a first digital transmission bit reate being one of a predetermined set of digital signals, and combining data words from said at least one digital signal group of data word positions with data words in a repetitive frame of said transmission signal, wherein said at least one digital signal is added to said transmission signal.

59. The method as defined in claim 58 wherein said step of combining includes controllably selecting data words from said at least one group of data word positions of said at least one digital signal being added and for controllably selecting data words from said transmission signal repetitive frame so that said at least one digital signal is added to said transmission signal.

60. The method as defined in claim 59 wherein asid step of combining further includes controllably interchanging data words in the data word positions of said transmission signal frame.

61. A method for dropping at least one digital signal having one of one or more digital transmission bit rates from a transmission signal formed by combining a plurality of digital signals of the one or more digital transmission bit rates, the transmission signal including a repetitive frame having a predetermined number of data word positions and a predetermined number of other word positions, comprising the steps of, obtaining data words from at least one group of data word positions in said transmission signal repetitive frame corresponding to said at least one digital signal being dropped, extracting a predetermined number of digital words from the data word positions of said obtained at least one group, supplying said number of extracted digital words during a frame interval of said transmission signal for said at least one digital signal being dropped from said transmission signal, the number of digital words extracted from said data word positions and supplied for said at least one digital signal being dropped being directly dependent on a number of equivalent ones of a digital signal having a first digital transmission bit rate in said at least one digital signal being dropped, said digital signal having a first digital transmission bit rate being one of a predetermined set of digital signals, and deformatting information in said extracted set of digital words to obtain a reconstructed version of said at least one digital signal being dropped.

62. The method as defined in claim 61 wherein said step of obtaining includes controllably selecting data words from data word positions in said transmission signal repetitive frame corresponding to said at least one group of data word positions of said at least one digital signal being dropped.

63. The method as defined in claim 62 wherein said step of obtaining further includes at least a first data word interchanging step for controllably interchanging data words in data word positions in said transmission signal repetitive frame being transmitted in a first direction of transmission and wherein said step of selecting controllably selects data words from data word positions in said transmission signal repetitive frame being transmitted in said first direction of transmission corresponding to said at least one digital signal being dropped.

64. The method as defined in claim 63 wherein said step of obtaining further includes a second data word interchanging step for controllably interchanging data words in data word positions in said transmission signal repetitive frame being transmitted in a second direction of transmission and wherein said step of selecting controllably selects data words from data word positions in said transmission signal repetitive frame being transmitted in said second direction of transmission corresponding to said at least one digital signal being dropped.

* * * * *